United States Patent [19]
Robert, III et al.

[11] Patent Number: 6,160,797
[45] Date of Patent: Dec. 12, 2000

[54] SATELLITE RECEIVER/ROUTER, SYSTEM, AND METHOD OF USE

[75] Inventors: Roswell Robert, III, San Diego; Ian Lerner, La Jolla; Laurence A. Fish, San Diego, all of Calif.; C. Brian Peabody, London, United Kingdom

[73] Assignee: StarGuide Digital Networks, Inc., Dallas, Tex.

[21] Appl. No.: 09/287,200

[22] Filed: Apr. 3, 1999

Related U.S. Application Data

[60] Provisional application No. 60/080,530, Apr. 3, 1998, and provisional application No. 60/105,878, Oct. 27, 1998.

[51] Int. Cl.[7] .................................................. H04L 12/46
[52] U.S. Cl. .......................................... 370/316; 455/12.1
[58] Field of Search .................................... 455/427, 428, 455/12.1; 370/535, 316, 469

[56] References Cited

U.S. PATENT DOCUMENTS

| | | | |
|---|---|---|---|
| 5,659,615 | 8/1997 | Dillon | 380/21 |
| 5,835,726 | 11/1998 | Shwed et al. | 395/200.59 |
| 5,991,596 | 11/1999 | Cunningham et al. | 455/12.1 |
| 5,995,726 | 11/1999 | Dillon | 395/200.61 |

FOREIGN PATENT DOCUMENTS

WO 98/20724  5/1998  WIPO.

OTHER PUBLICATIONS

StarGuide Digital Networks, Inc., StarGuide II Digital Multimedia Satellite Receiver,1996, USA.
StarGuide Digital Networks,Inc., StarGuide MX3 Digital Multimedia Multiplexer, 1996, USA.
StarGuide Digital Networks, Inc., Musicam MPEG LayerII Digital Audio Decoder Module, 1996, USA.
StarGuide Digital Networks, Inc., MPEG 2 Digital Video Decoder Module, 1996, USA.
StarGuide Digital Networks, Inc., RS–422, v.35, RS–232C Synchronous Data Clear Channel Interface Module, 1996, USA.
StarGuide Digital Networks, Inc., RS–232 Asynchronouse Services Statistical Demux Interface Module 1996, USA.

*Primary Examiner*—Douglas W. Olms
*Assistant Examiner*—Ken Vanderpuye
*Attorney, Agent, or Firm*—Robert C. Ryan; McAndrews, Held & Malloy, Ltd.

[57] ABSTRACT

This specification discloses a satellite transmission system for transmission of TCP/IP compatible packets from a head end computer through a satellite uplink, an extraterrestrial satellite, a satellite downlink, and an integrated satellite receiver/router for outputting of the TCP/IP compatible packets through a port on the receiver/router onto a computer LAN or WAN. The system may include an Internet or telecommunications backchannel. The receiver becomes router enabled by means of a removable insertion Ethernet/Router insertion card inserted into a slot in the receiver, although the transmission system may be used to simultaneously transmit a variety of other services through the receiver by use of other service slots in the receiver. The Ethernet/Receiver supports the IGMPv2 Multicasting (querier and non querier modes), standard TCP/IP (including UDP and Telnet), and SNMP protocols.

24 Claims, 25 Drawing Sheets

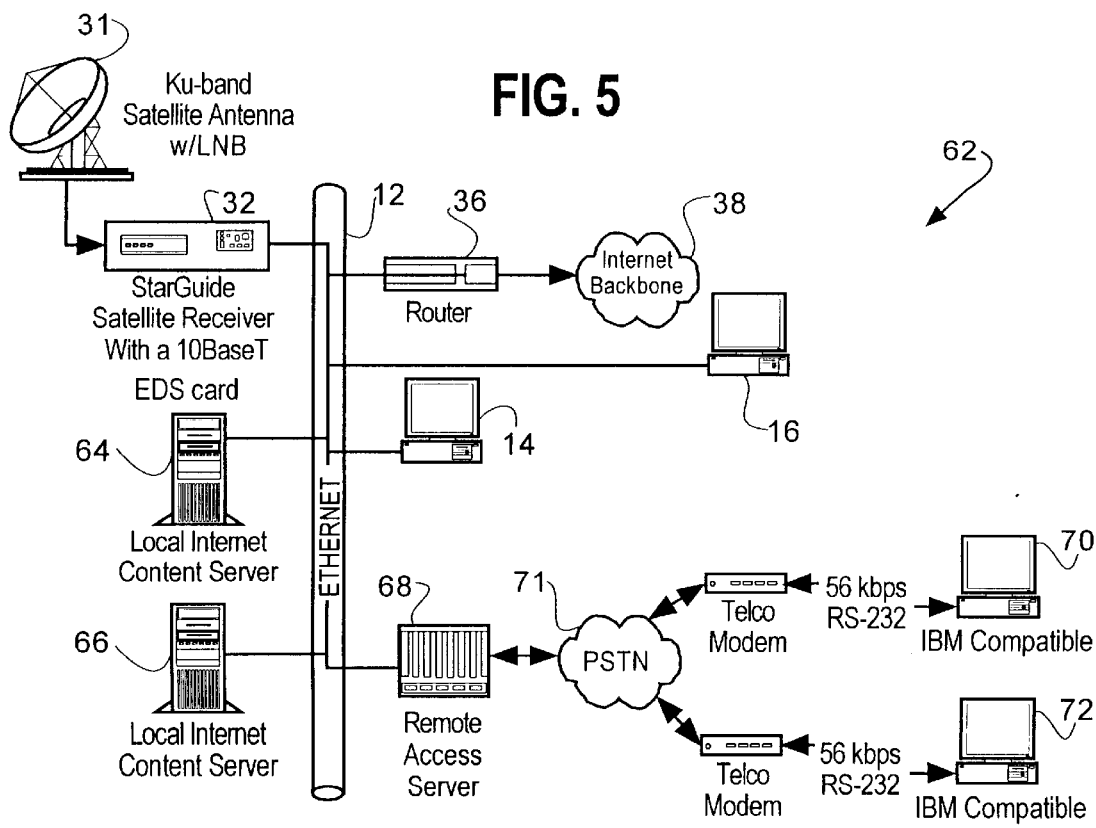

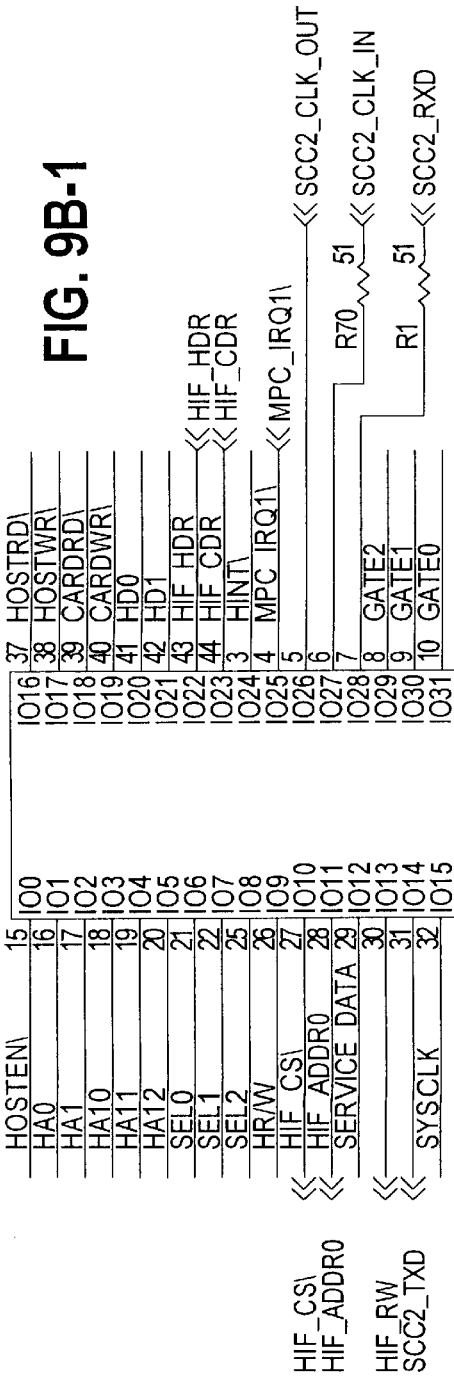
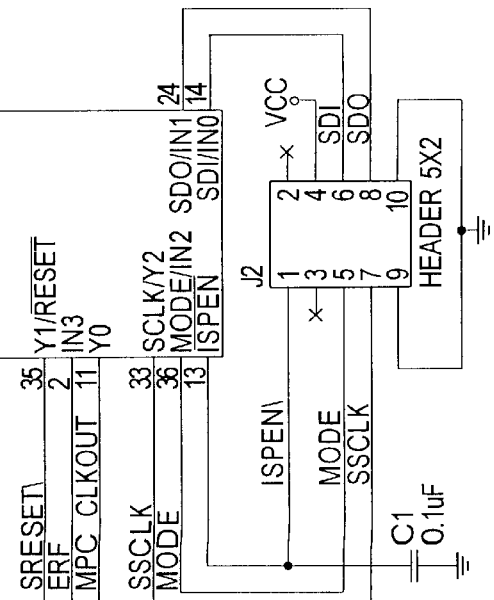
FIG. 9B
FIG. 9B-1

FIG. 10B
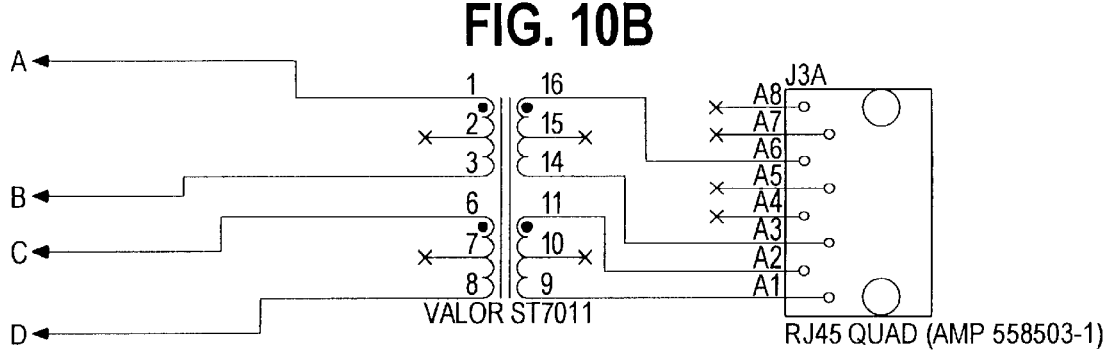
VALOR: ST7011
HALO: TG42-1406N1
BELFUSE: S553-0716
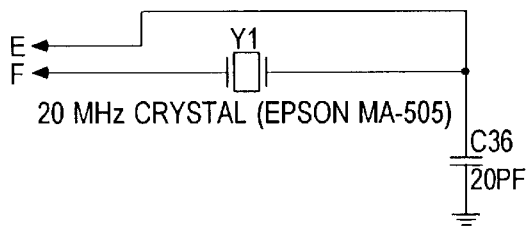
20 MHz CRYSTAL (EPSON MA-505)
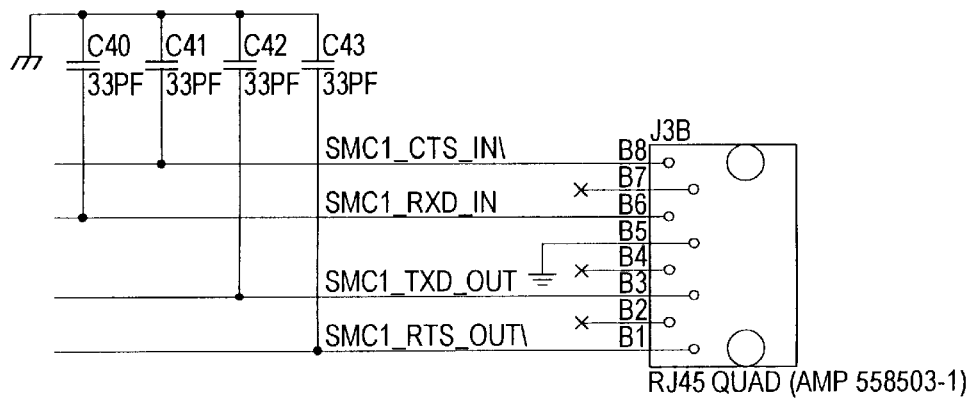
IBM COMPATIBLE PC RS-232 DB-9 MALE PINOUT:
PIN 2 - RX INPUT TO PC
PIN 3 - TX OUTPUT FROM PC
PIN 5 - GROUND
PIN 7 - RTS OUTPUT FROM PC
PIN 8 - CTS INPUT TO PC
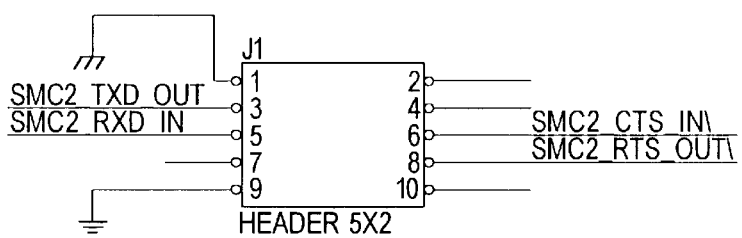

FIG. 11B
NOTE:
FG1 SHOULD BE CONNECTED
TO CHASSIS GROUND
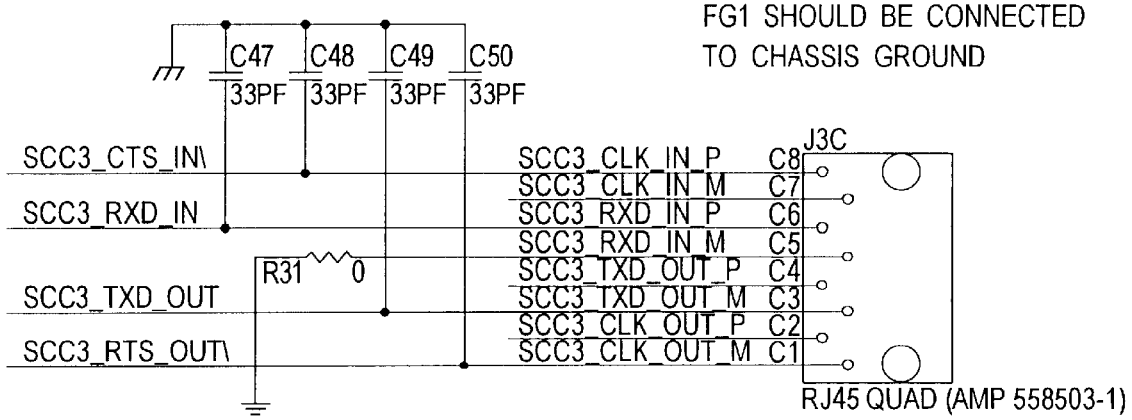
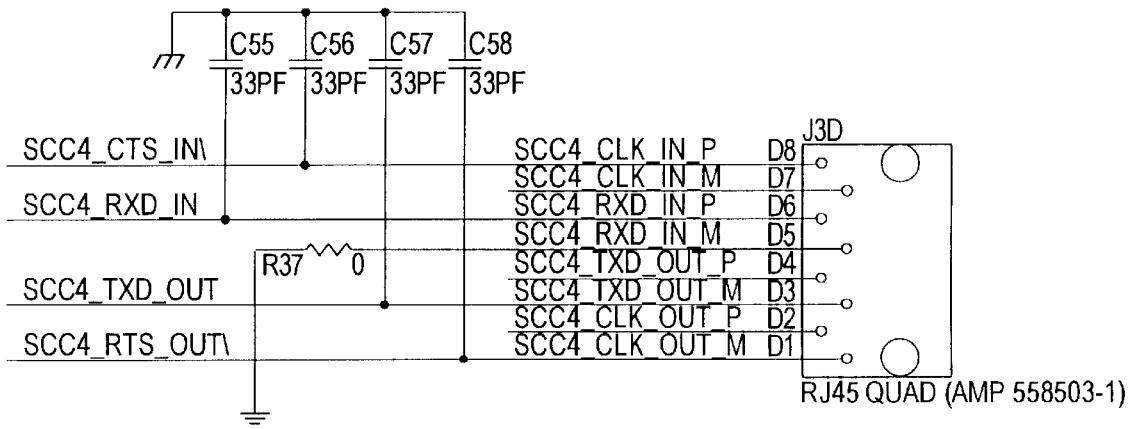

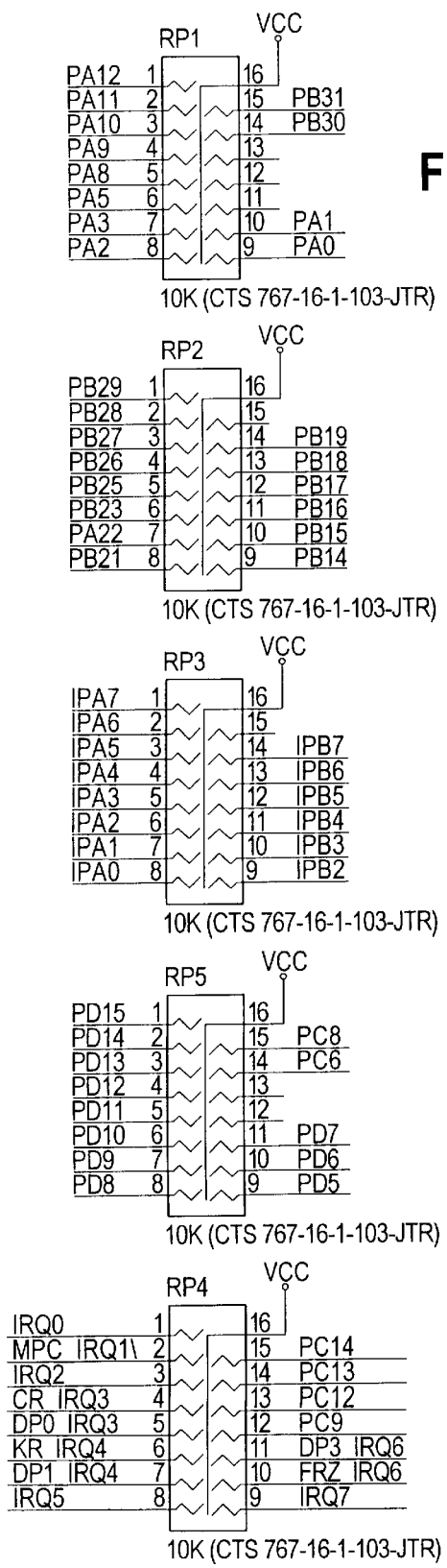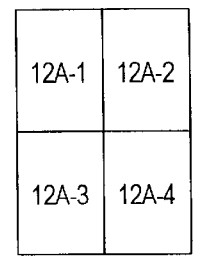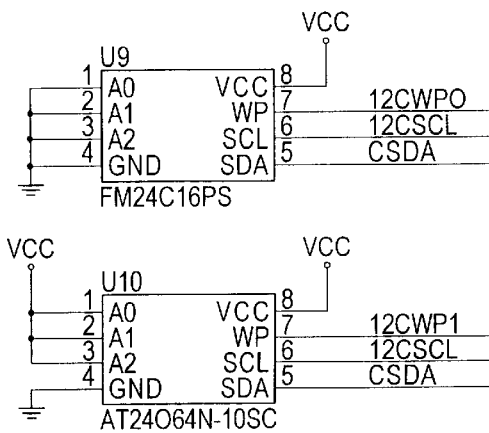
FIG. 12A
FIG. 12A-1
PORTS A,B,C AND D DO
NOT HAVE MPC860
INTERNAL PULLUP
RESISTORS.

| 12B-1 | 12B-2 |
|---|---|
| 12B-3 | 12B-4 |

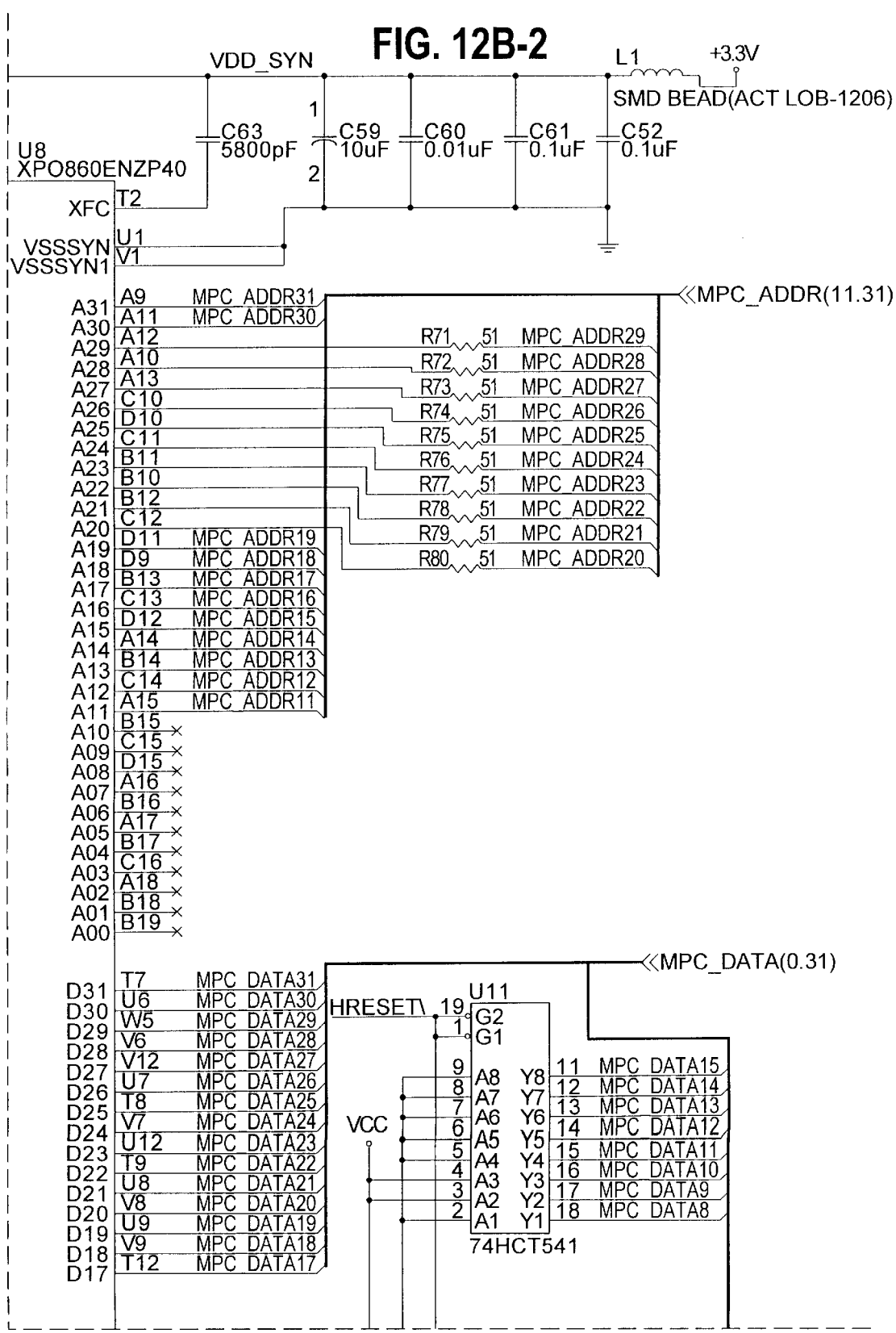

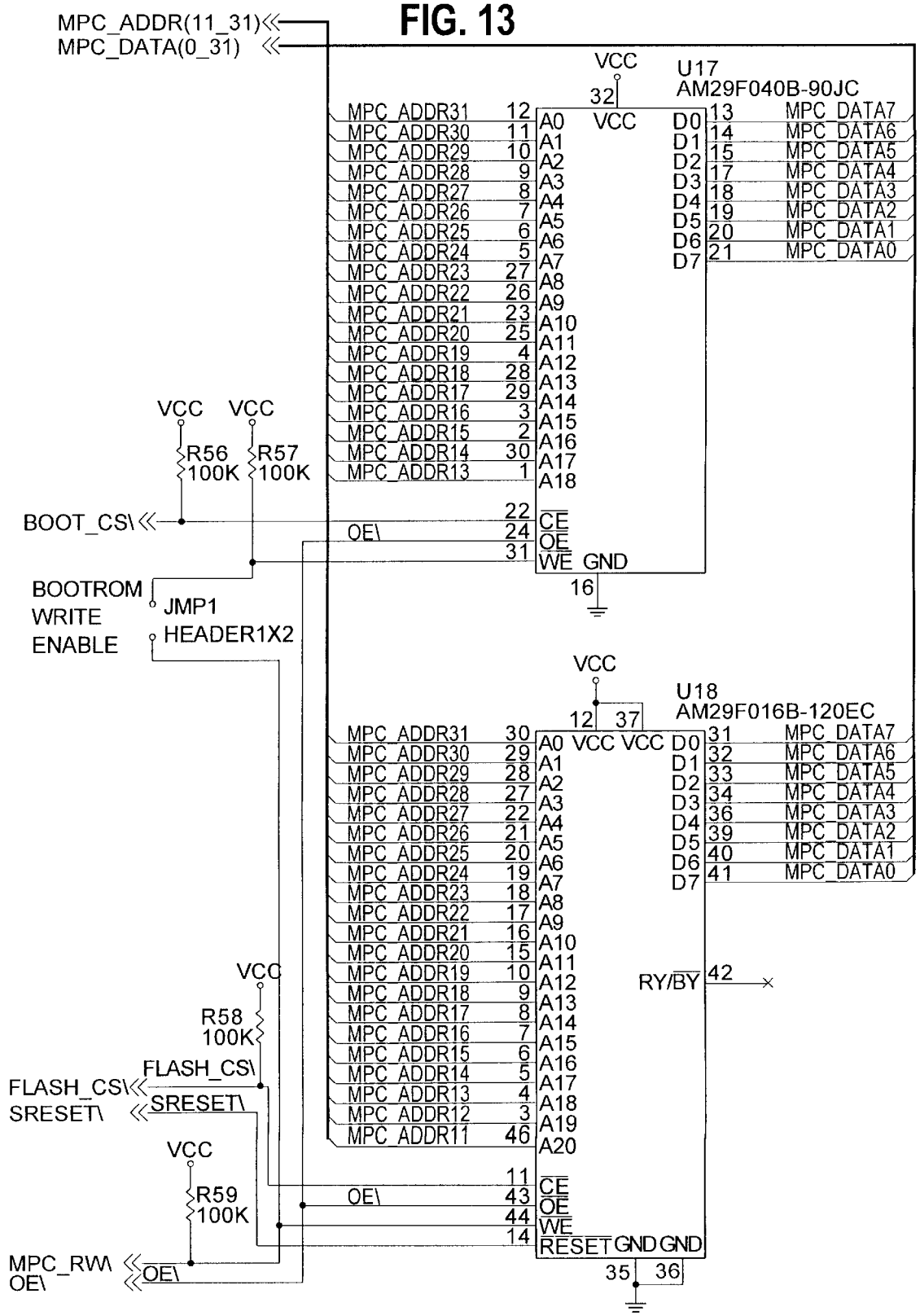

SATELLITE RECEIVER/ROUTER, SYSTEM, AND METHOD OF USE

CROSS-REFERENCE TO RELATED APPLICATIONS

This application is a continuation of, and claims priority through, two prior provisional U.S. patent applications. (i) Ser. No. 60/080,530, filed Apr. 3, 1998, entitled "Ethernet Satellite Delivery Apparatus"; and (ii) Ser. No. 60/105,878, filed Oct. 27, 1998, entitled "Ethernet Satellite Delivery Apparatus," the disclosures of each of which are incorporated herein by reference.

FIELD OF THE INVENTION

This invention relates to satellite delivery of TCP/IP compatible content. More particularly, this invention relates to a removable insertion card, and method of its use, in a satellite transmission system to provide integrated receiver/routers with the ability to distribute TCP/IP compatible content into a computer network.

BACKGROUND

The Internet is an enormous network of computers through which digital information can be sent from one computer to another. The Internet's strength—its high level of interconnectivity—also poses severe problems for the prompt and efficient distribution of voluminous digital information, particularly digitized imaging, audio, or video information.

Internet service providers (ISP's) have attempted to accelerate the speed of delivery of content to Internet users by delivering Internet content (e.g., TCP/IP packets) to the user through a satellite broadcast system. One such system is the direct-to-home ("DTH") satellite delivery system such as that offered in connection with the mark, "DirecPC." In these DTH types of systems, each subscriber or user of the system must have: (i) access to a satellite dish; (ii) a satellite receiver connected to the satellite dish and mounted in the user's PC; and (iii) an Internet back channel in order to request information from Internet Web sites.

The DTH system is thus quite costly, since each user must have its own receiver and connection to a satellite dish. The DTH system is also somewhat difficult to deploy since the satellite receiver is mounted in each DTH user's PC.

The DTH system also does not take advantage of any pre-existing satellite systems, and it often is a single carrier system, dedicated to the delivery of Internet content to the user. It does not allow the user flexibility to receive, much less distribute to others, other types of services, such as non-Internet radio broadcast or faxing services for example. The DTH systems also typically modify the IP packets at the head end, thus introducing significant processing delay through the need to reconstruct packets on the receiving end.

DTH systems may also utilize the DVB standard, in which event the system might broadcast other services. DVB systems, however, utilize a statisitical data carrier. For this and other reasons, the DVB systems often cause significant additional delay due to the need to reconstruct packets from the statistically mulitplexed carrier sent through DVB system.

The DTH system is also typically quite limited in its bandwidth capabilities. The consumer DirecPC system, for example, is limited to 440 kbps, thus limiting its effectiveness as a reliable, flexible, and quick distribution vehicle for Internet content, particularly voluminous content, to all users of the system through the one carrier.

Another system used by ISP's and others to deliver Internet content through satellites is the use of commercial or professional quality satellite receivers in conjunction with traditional routers connected into an ISP LAN or similar LAN for delivery the received content through its LAN to its subscribers either on the LAN or through modems and telecommunications lines interconnecting the modems. (See Prior Art FIG. 3.) These types of separate receiver-and-router satellite systems have typically required use of traditional satellite data receivers with integrated serial, often RS-422 types, of interface or data outputs. The data output is connected into the router, which then converts the data into Ethernet compatible output and routes and outputs the Ethernet onto the LAN.

The applicant has discovered that these prior art data receiver and separate router systems present several problems. For example, the traditional data receivers are relatively inflexible and support only one or two services; and the use of a separate router is expensive. In addition, these types of systems usually employ a DVB transport mechanism, which not well suited to transmitting Internet and similar types of content for a number of reasons. One reason is that, as noted above, the DVB transport protocol and mechanism add substantial delays into the system. Another is that, as the applicant has discovered, the DVB transport mechanism utilizes excessive amounts of bandwidth.

BRIEF SUMMARY OF THE INVENTION

The applicants have invented an Ethernet/Router card, method of its use in a satellite receiver, and overall TCP/IP compatible satellite transmission system. The Ethernet/Router card enables the satellite receiver to provide the service of receiving a broadcast of TCP/IP compatible information or content, and route and output the information or content in Ethernet format directly onto a LAN or other Ethernet computer connection. The Ethernet/Router card preferably includes an internal router and is preferably compatible with protocols, including UDP and SMTP, which enable the card to properly route the TCP/IP compatible content onto the LAN or other Ethernet computer connection.

The Ethernet/Router card also preferably includes one or more serial outputs or ports in order to provide data services or connectivity in addition to that provided through the Ethernet port. The Ethernet/Router card preferably is removably insertable, and hot swappable, into a slot in the satellite receiver The applicant's satellite transmission system, and particularly its Ethernet/Router card, are preferably adapted to process each IP packet as an entire block, eliminating the need to break up or reconstruct packets of IP data at the receiving end. The preferred system thus speeds up the processing, reception, and distribution of the IP data through the system.

There are other aspects and features of the invention that will become apparent as the specification proceeds. It is to be understood, however that the scope of the invention is to be determined according to the accompanying claims.

OBJECTS OR ADVANTAGES OF THE INVENTION

It is an object of the invention to distribute TCP/IP compatible content by satellite.

It is an advantage of the present invention that it provides an Ethernet/router card that can be mounted in a satellite receiver quickly, easily, and economically.

It is another advantage of the present invention that it provides a satellite receiver with the capability of receiving TCP/IP compatible content and routing and distributing it onto a LAN or other computer network without need for a router to route the content onto the LAN or network.

It is still another advantage that the preferred card is hot swappable and may be removed from the receiver without interfering with any other services provided by the receiver.

It is still another advantage of the present invention that the preferred card can be used in a receiver that can deliver other services, through other cards, in addition to those provided by the present invention itself.

A still further advantage is that it provides satellite distribution of TCP/IP compatible content the need for each PC receiving the content through the receiver to have its own dish or its own satellite receiver.

An additional advantage is that the present invention provides satellite TCP/IP distribution to PC's without having a satellite receiver being mounted in a PC and subject to the instability of the PC environment.

Yet an additional advantage is that the present card can preferably provide data services in addition to delivery of Internet content. Another advantage is that the satellite receiver in which the card is inserted preferably can provide yet additional services through other cards inserted in slots in the receiver.

Another advantage is that existing networks of satellite receivers can be adapted to deliver Internet services by mere insertion of the present cards in the receivers, without having to replace the existing networks.

It is also an advantage of the present invention that the present system and insertion card preferably provides the ability to deliver TCP/IP content to Ethernet LAN's without need for custom software.

Another advantage is the present invention is that, both the overall system and the Ethernet/Router card in particular, process IP packets without modification or separation of the contents of the packets. The applicants' satellite transmission system and the present Ethernet/Router card are thus easier to implement; and since they process each IP packet as an entire block with no need to reconstruct packets on the receiving end, the system and the Ethernet/Router card more quickly process and route the IP packets from the head end to an associated LAN on the receiving end.

There are many other objects and advantages of the present invention. They will become apparent as the specification proceeds. It is to be understood, however, that the scope of the present invention is to be determined by the accompanying claims and not by whether any given embodiment achieves all objects or advantages set forth herein.

BRIEF DESCRIPTION OF THE DRAWINGS

The applicants' preferred embodiment of the present invention is shown in the accompanying drawings wherein:

FIG. 5 is a block diagram of the applicants' preferred downlink configuration for reception of a multiplexed satellite transmission for distribution onto an associated LAN;

FIG. 6 is a block diagram of the applicants' preferred redundant uplink configuration for clear channel transmission of up to 10 mbps;

FIG. 10A–B is a wiring diagram for the RS 232 monitor and control port of the preferred Ethernet/Router card of FIG. 8;

FIG. 11A–B is a wiring diagram for the two RS 232 auxiliary ports of the preferred embodiment of FIG. 8;

FIG. 13 is a wiring diagram for the DRAM on the preferred embodiment of FIG. 8;

DETAILED DESCRIPTION OF THE PREFERRED EMBODIMENTS

Figure 1:
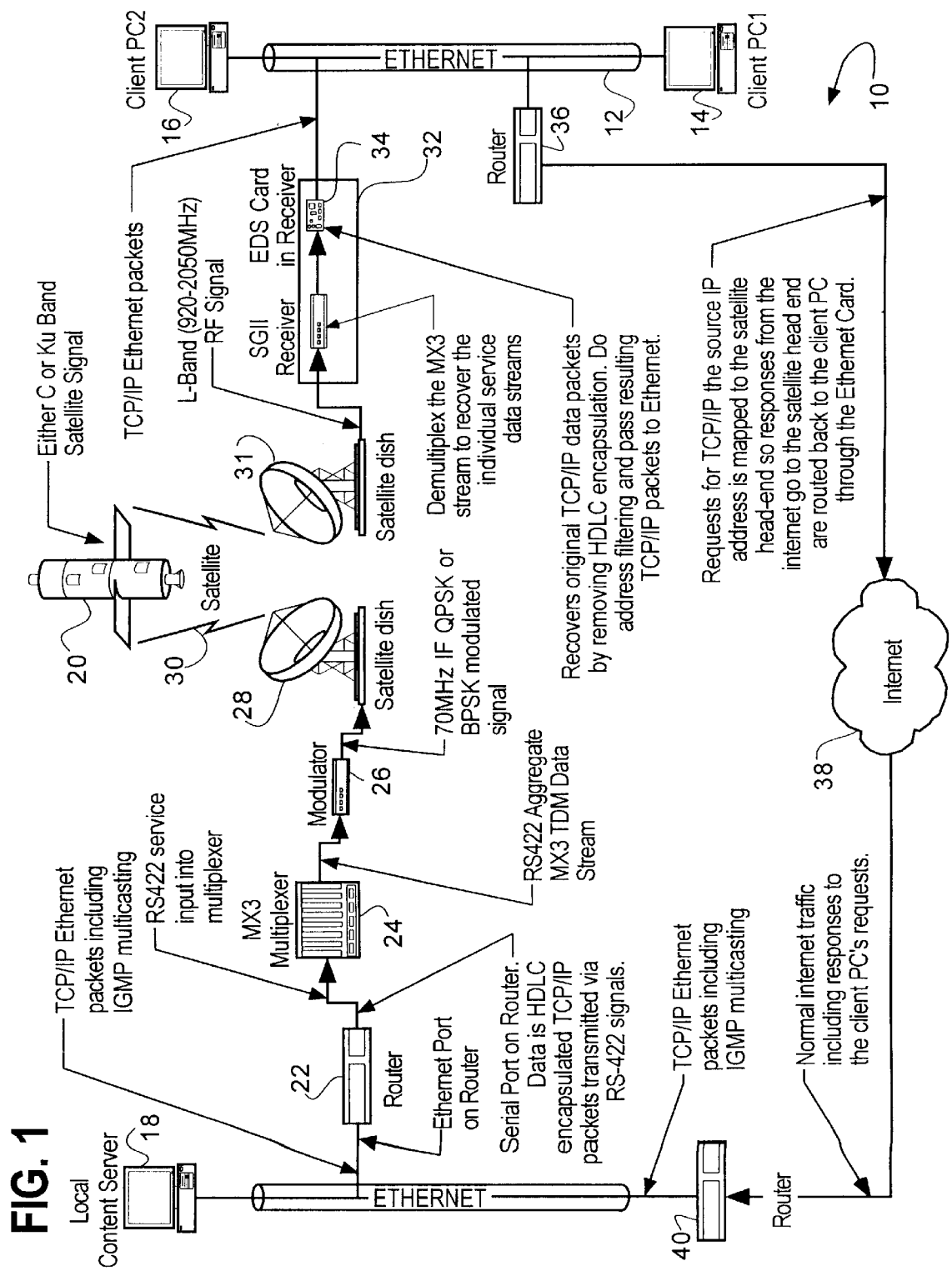
FIG. 1 is a block diagram of one embodiment of the applicants' preferred satellite transmission system, with an Internet backchannel, in which the applicants' preferred Ethernet/Router card has been inserted into a slot in a satellite receiver in order to distribute Internet content through the card onto an Ethernet LAN to which the card is connected.

Referring now to FIG. 1, the applicants' preferred Internet backchannel system 10 is preferably utilized to distribute Internet content (according to the TCP/IP protocol, which may include UDP packets) onto a remote LAN 12 interconnecting PC's, e.g., 14, 16, on the remote LAN 12. Through the applicants' preferred Internet satellite transmission system 10, content residing on a content server PC 18 is distributed according to the TCP/IP protocol through a third-party satellite 20 to the client PC's 14, 16 on the remote Ethernet LAN 12.

In the applicants' preferred system 10, the TCP/IP content flow is as follows:

1. A PC, e.g., 14, on the remote Ethernet LAN 12 is connected to the Internet through a conventional, and typically pre-existing, TCP/IP router 36 in a fashion well known to those skilled in the art. The router 36 can thus send requests for information or Internet content through the Internet 38 to a local router 40 to which a content server 18 (perhaps an Internet web server) is connected in a fashion well known to those skilled in the art.
2. The content server 18 outputs the Internet content in TCP/IP Ethernet packets for reception at the serial port (not shown) on a conventional Internet router 22;
3. The router 22 outputs HDLC encapsulated TCP/IP packets transmitted via RS-422 signals at an RS-422 output port (not shown) into an RS-422 service input into a StarGuide® MX3 Multiplexer 24, available from Star- Guide Digital Networks, Inc., Reno, Nev. (All further references to StarGuide® equipment refer to the same company as the manufacturer and source of the equipment.) The method of multiplexing utilized by the MX3 Multiplexer is disclosed in Australia Patent No. 697851, issued on Jan. 28, 1999, to StarGuide Digital Networks, Inc, and entitled "Dynamic Allocation of Bandwidth for Transmission of an Audio Signal with a Video Signal."

4. The StarGuide® MX3 Multiplexer 24 aggregates all service inputs into the Multiplexer 24 and outputs a muliplexed TDM (time division multiplexed) data stream through an RS-422 port (not shown) for delivery of the data stream to a modulator 26, such as a Comstream CM701 or Radyne DVB3030, in a manner well known to those skilled in the art. The modulator 26 supports DVB coding (cancatenated Viterbi rate N/(N+1) and Reed-Solomon 187/204, QPSK modulation, and RS-422 data ouput). Multiple LANs (not shown) may also be input to the StarGuide® Multiplexer 24 as different services, each connected to a different service input port on the StarGuide® Multiplexer 24;

5. The modulator 26 outputs a 70 MHz RF QPSK or BPSK modulated signal to a satellite uplink and dish antenna 28, which transmitts the modulated signal 30 through the satellite 20 to a satellite downlink and dish antenna 31 remote from the uplink 28.

6. The satellite downlink 31 delivers an L-Band (920–2050 MHz) radio frequency (RF) signal through a conventional satellite downlink downconverter to a StarGuide® II Satellite Receiver 32 with the applicants' preferred Ethernet/Router card 34 removably inserted into one of possibly five available insertion card slots (not shown) in the back side of the StarGuide® II Receiver 32. The StarGuide® II Receiver 32 demodulates and demultiplexes the received transmission, and thus recovers individual service data streams for use by the cards, e.g., 34, mounted in the StarGuide® II Receiver 32. The Receiver 32 might also have StarGuide® one or more audio card (s), video card(s), relay card(s), or async card(s) inserted in the other four available slots of the Receiver 32 in order to provide services such as audio, video, relay closure data, or asyncronous data streams for other uses or applications of the single receiver 34 while still functioning as a satellite receiver/router as set forth in this specification.

7. The Ethernet/Router card 34 receives its data and clock from the StarGuide® II Receiver 34, then removes the HDLC encapsulation in the service stream provided to the card 34 by the StarGuide® II Receiver 32, and thus recovers the original TCP/IP packets in the data stream received from the Receiver 32 (without having to reconstruct the packets). The Ethernet/Router card then performs address filtering and routes the resulting TCP/IP packets out the Ethernet port on the side of the card (facing outwardly from the back of the StarGuide® II Reciver) for connection to an Ethernet LAN for delivery of the TCP/IP packets to addressed PCs, e.g., 14, 16 if addressed, on the LAN in a fashion well to those skilled in the art.

As a result, high bandwidth data can quickly move through the preferred satellite system 10 from the content server 18 through the one-way satellite connection 20 to the receiving PC, e.g., 14. Low bandwidth data, such as Internet user requests for web pages, audio, video, etc., is sent from the remote receiving PC, e.g., 14, through the inherently problematic but established Internet infrastucture 38, to the content server 18. Thus, as client PC's, e.g., 14, 16, request data, the preferred system 10 automatically routes the requested data (provided by the content server 12) through the higher bandwidth satellite 20 transmission system to the StarGuide® II Receiver and its associated Ethernet/Router card(s) 34 for distribution to the PC's 14, 16 without going through the Internet 38 infrastructure.

Figure 2:
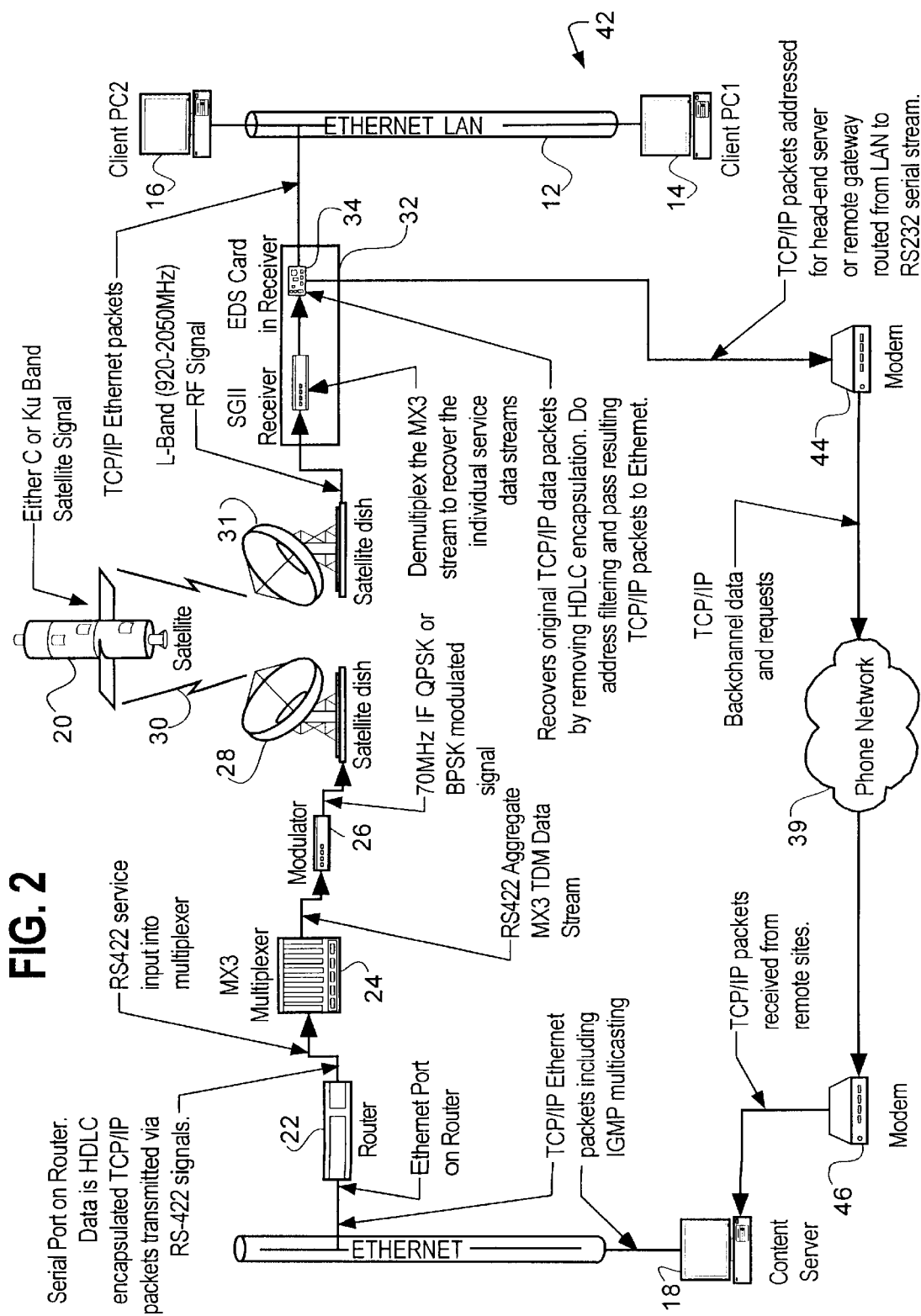
FIG. 2 is a block diagram of an alternative embodiment of the applicants' preferred satellite transmission system for distribution of TCP/IP content onto an intranet with a telecommunications-modem-provided backchannel from the receiver to the head-end of the intranet.
Figure 3:
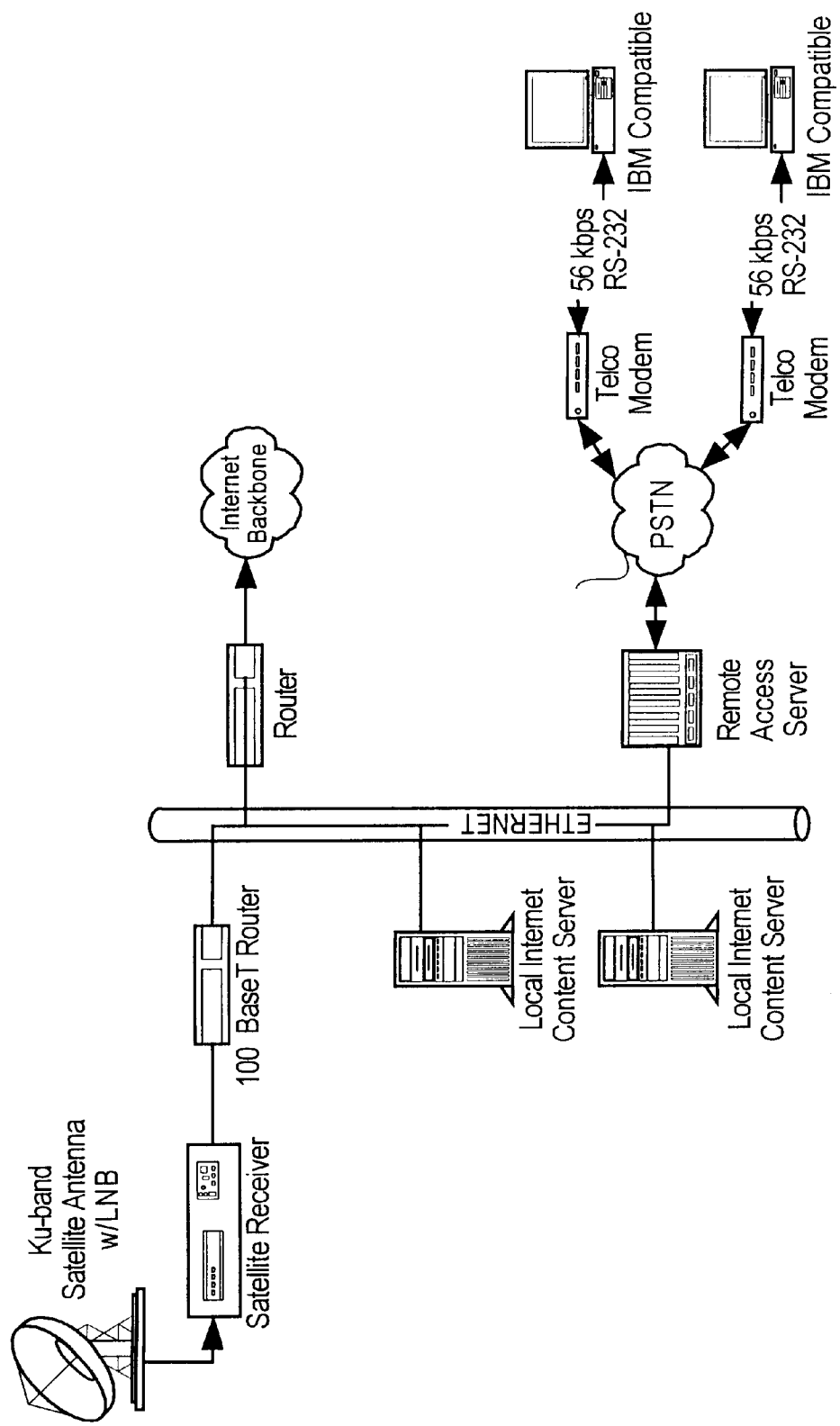
FIG. 3 is a block diagram of a prior art satellite data receiver, separate Internet router, and LAN, as described in the BACKGROUND section above.

Referring now to FIG. 2, the applicants' preferred intranet system 42 is preferably utilized to distribute TCP/IP formatted content onto a remote LAN 12 interconntecting PC's, e.g., 14, 16, on the remote LAN 12. Through the intranet system 42, content residing on a content server PC 18 is distributed through the intranet 42 to the client PC's 14, 16 through a private telecommunications network 39.

The intranet system 42 of FIG. 2 works similarly to the Internet system 10 of FIG. 1 except that the intranet system 42 does not provide a backchannel through the Internet 40 and instead relies on conventional telecommunications connections, through conventional modems 44, 46, to provide the backchannel. In the applicants' preferred embodiment the remote LAN modem 44 connects directly to an RS-11 port on the outwardly facing side of Ethernet/Router card 34 on the back side of the StarGuide® II Receiver 32 in which the card 34 is mounted. The Ethernet/Router card 34 routes TCP/IP packets addressed to the head end or content server 18 (or perhaps other machines on the local LAN 19) to an RS232 serial output (113 in FIG. 8) to the remote LAN modem 44 for delivery to the content servers or head end 18. Alternatively, the remote modem 44 may be connected to accept and transmit the TCP/IP data and requests from a client PC, e.g., 14, through a router (not shown) on the remote LAN 12, in a manner well known to those skilled in the art.

The local modem 46 is connected to the content server 18 or to a head-end LAN on which the server 18 resides. The two modems 44, 46 thus provide a TCP/IP backchannel to transfer TCP/IP data and requests from PC's 14, 16 on the remote LAN (which could also be a WAN) 12 to the content server 18.

Figure 4:
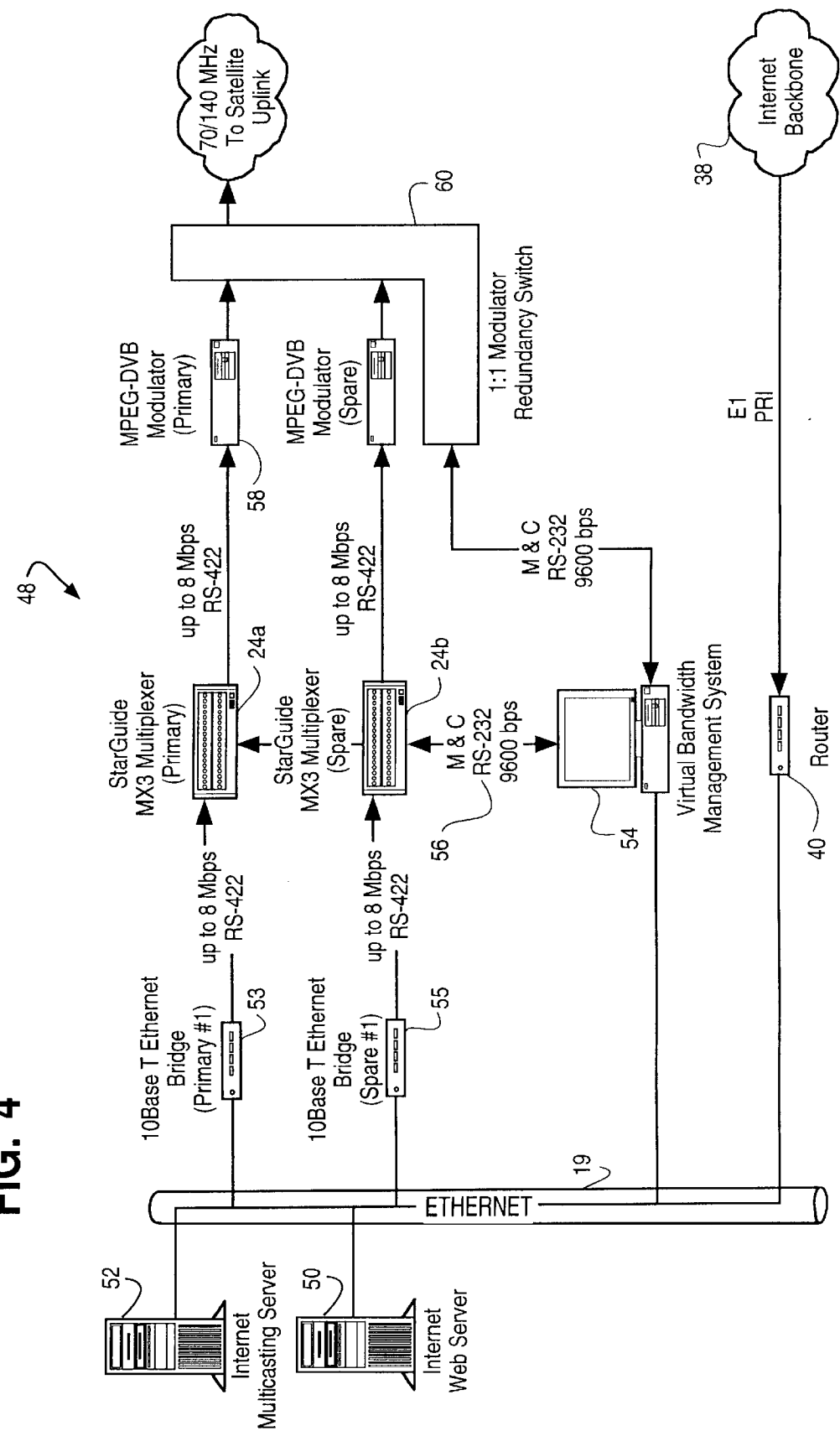
FIG. 4 is a block diagram showing the applicant's preferred uplink configuration utilizing a multiplexer to multiplex the satellite transmission.

Referring now to FIG. 4, the applicants' preferred "muxed" uplink system, generally 48, is redundantly configured. The muxed system 48 is connected to a local or head-end Ethernet LAN 19, to which an Internet Web Server 50 and Internet Multicasting Server 52 are connected in a manner well known to those of skill in the art. Two 10BaseT Ethernet Bridges 53, 55 provide up to 8 mbps (megabits per second) of Ethernet TCP/IP data into RS422 service ports (not shown) mounted in each of two StarGuide® MX3 Multiplexers 24a, 24b, respectively. The main StarGuide® Multiplexer 24a is connected via its monitor and control (M&C) ports (not shown) through the spare Multplexer 24b to a 9600 bps RS-232 link 56 to a network management PC 54 running the Starguide® Virtual Bandwidth Network Management System (VBNMS).

Each of the Multplexers. e.g., 24a, output up to 8 mbps through an RS422 port and compatible connection to an MPEG-DVB modulator, e.g, 58. The modulators, e.g., 58, in turn feed their modulated output to a 1:1 modulator redundancy switch 60 and deliver a modulated RF signal at 70 to 140 MHz for transmission through the satellite (20 in FIG. 1). In this regard, the VBNMS running on the network management PC 54 is also connected to the redundancy switch 60 via an M&C RS-232 port (not shown) on the redundancy switch 60.

With reference now to FIG. 5, in the applicants' preferred muxed downlink, generally 62, there is no need for a router between the StarGuide® II Satellite Receiver 32 and the remote LAN 12. The Receiver 32 directly ouputs the Ethernet encapsulated TCP/IP packets from the Ethernet output port (not shown) on the Reciever 32 onto the LAN cabling 12 with no intermediary hardware at all other than standard in inexpensive cabling hardware.

The LAN 12 may also be connected to traditional LAN and WAN components, such as local content servers 64, 66, router(s), e.g., 36, and remote access server(s), e.g., 68, in addition to the LAN-based PC's, e.g., 14, 16. In this WAN configuration, yet additional remotely connected PC's 70, 72, may dial-in or be accessed on conventional telecommunications lines, such as POTS lines through a public switching teclo network (PTSN) 71 to procure TCP/IP or other content acquired by the remote access server 68, including TCP/IP content delivered to access server 68 according to addressing to a remotely connected PC, e.g., 70, of packets in the Ethernet data stream output of the Ethernet/Router card (34 in FIG. 1).

With reference now to FIG. 6, the applicants' preferred clear channel system, generally 74, eliminates the need for both costly multiplexers (e.g., 24 in FIG. 4) and the VBNMS and associated PC (54 of FIG. 4). The clear channel system 74 is well suited to applications not requiring delivery of multiple services through the system 74. The clear channel system 74 of FIG. 6 provides up to 10 mbps of Ethernet TCP/IP data directly into the input of an MPEG-DVB modulator, e.g., 58, for uplinking of the frequency modulated data for broadcast through the satellite (20 in FIG. 1). (Note that, although these systems employ MPEG-DVB modulators, they do not utilize DVB multiplexers or DVB encrypting schemes.)

Figure 7:
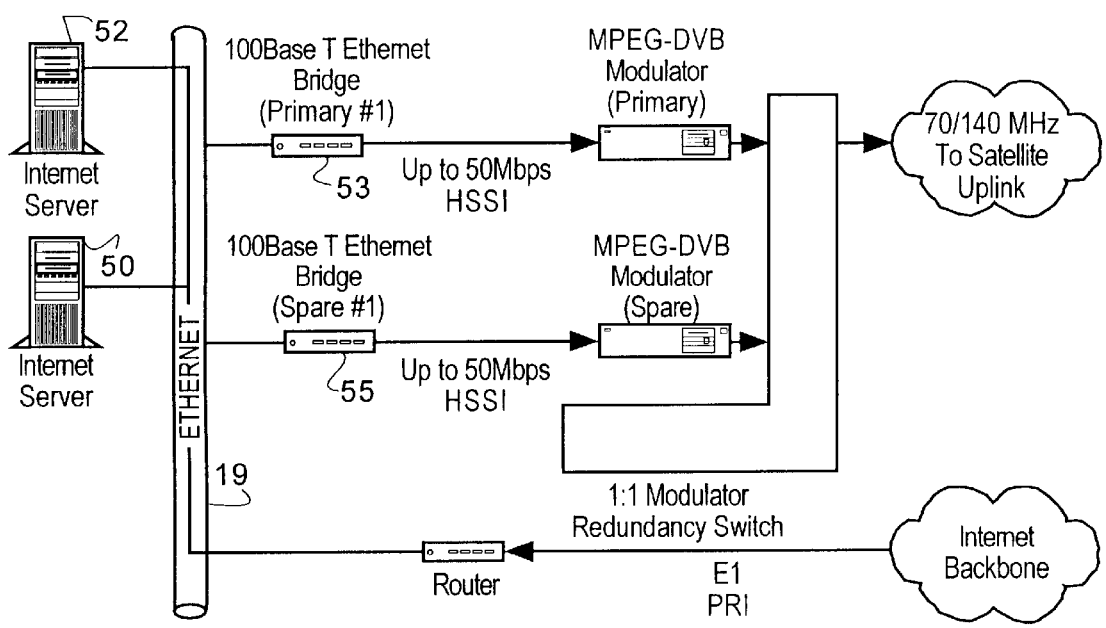
FIG. 7 is a block diagram of the applicants' preferred redundant uplink configuration for clear channel transmission of up to 50 mbps.

Alternatively and with reference now to FIG. 7. the bridges 53, 55 may each instead consist of a 100BaseT Ethernet router 53, 55. As a result, these routers 53, 55 preferably may deliver up to 50 mbps HSSI output directly into their respective modulators, e.g, 58. Applicants' preferred modulator for this application is a Radyne DM-45 available from Radyne Corporation.

Figure 8:
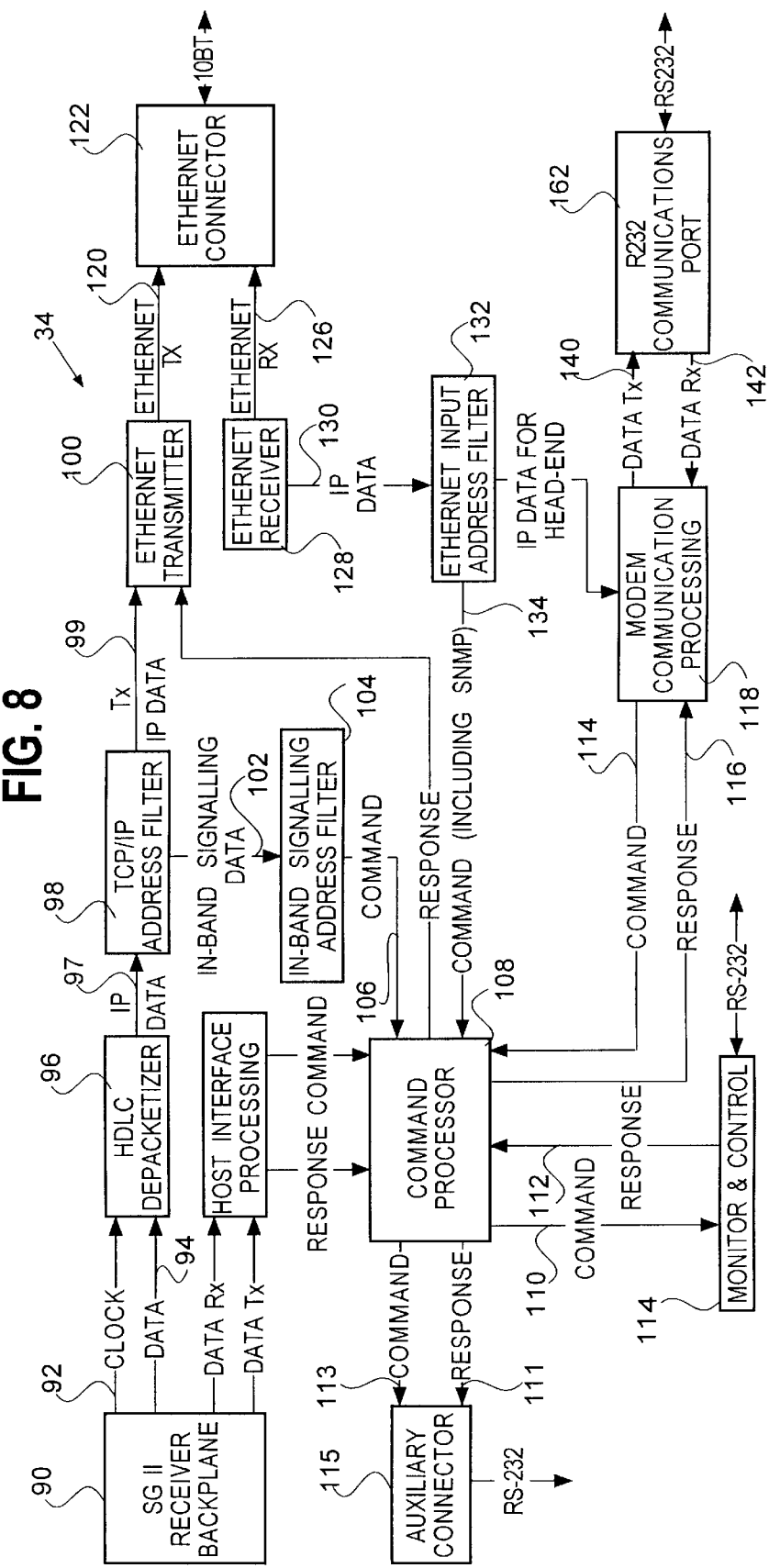
FIG. 8 is a block diagram of the preferred Ethernet/Router insertion card.

Referring now to FIG. 8. the applicant's preferred Ethernet/Router card, generally 34, has a receiver backplane 90 for interfacing with the StarGuide® II Receiver (32 in FIG. 1) when the card 34 is removably inserted in an available slot in the Receiver 32. In a muxed system (FIGS. 1, 2, and 4), the Receiver 32 is pre-configured by the user (not shown) to identify the particular Receiver 32 slot in which the card 24 is mounted. In the clear channel mode (FIGS. 6 and 7), the identical service is presented to all five slots in the Receiver 32, so the no such pre-configuration is required.

With continuing reference to FIG. 8, the backplane interface 90 provides the card 34 with a clock 92 and the HDLC packetized TCP/IP data stream 94 as the input into the HDLC depacketizer 96, which outputs TCP/IP packets and data 97, previously encapsulated in HDLC by the head-end router (22 in FIG. 1), to a TCP/IP address filter 98. In turn, the address filter 98: (i) outputs the TCP/IP packets and data 99 to an Ethernet transmitter 100, and (ii) routes certain TCP/IP packets (i.e., UDP packets having a particular address common to all Ethernet/Router cards) as in-band signaling data 102 into an in-band signalling address filter 104. This in-band signalling filter 104 routes certain UDP packets as commands 106 directed to a command processor 108 on the card 34. The TCP/IP packets routed in this fashion are limited to an average data rate of less than 115 kbps to prevent overloading of the asynchronous interfaces.

The Ethernet transmitter 100 provides Ethernet output 120 (including the TCP/IP packets for distribution by the card 34 to the LAN (12 in FIG. 1)) to a 10baseT Ethernet connector 122 on the card 34. The Ethernet connector 122 also receives Ethernet input 126 from the LAN (12 in FIG. 1), which is received by the Ethernet receiver 128 on the card 34. The Ethernet receiver 128 outputs the TCP/IP and any data 130 received by the card 34 to an Ethernet input address filter 132, which provides commands (including SNMP) 134 addressed to the card 34 to the command processor 108. The Ethernet input address filter 132 also provides data addressed for the head-end, e.g., the content server (18 in FIG. 1), to the modem communication processor 118. The modem communication processor 118 optionally provides data transmission 140 and data reception 142 through an RS-2323 communications port 144.

The command processor 108 optionally outputs commands 110 to, and receives as input responses 112 received from, an RS-232 M&C port 114 on the card 34. The command processor also: (i) optionally exchanges commands 111 and responses 113 with at least one auxiliary RS-232 port 115; (ii) optionally provides command output 114, and receives input responses 116 from, a modem communication processor 118; and (iv) outputs responses 136 to the Ethernet transmitter 100 when necessary to assure complete receipt of all TCP/IP data packets for users on the LAN (12 in FIG. 1).

Figure 9A:
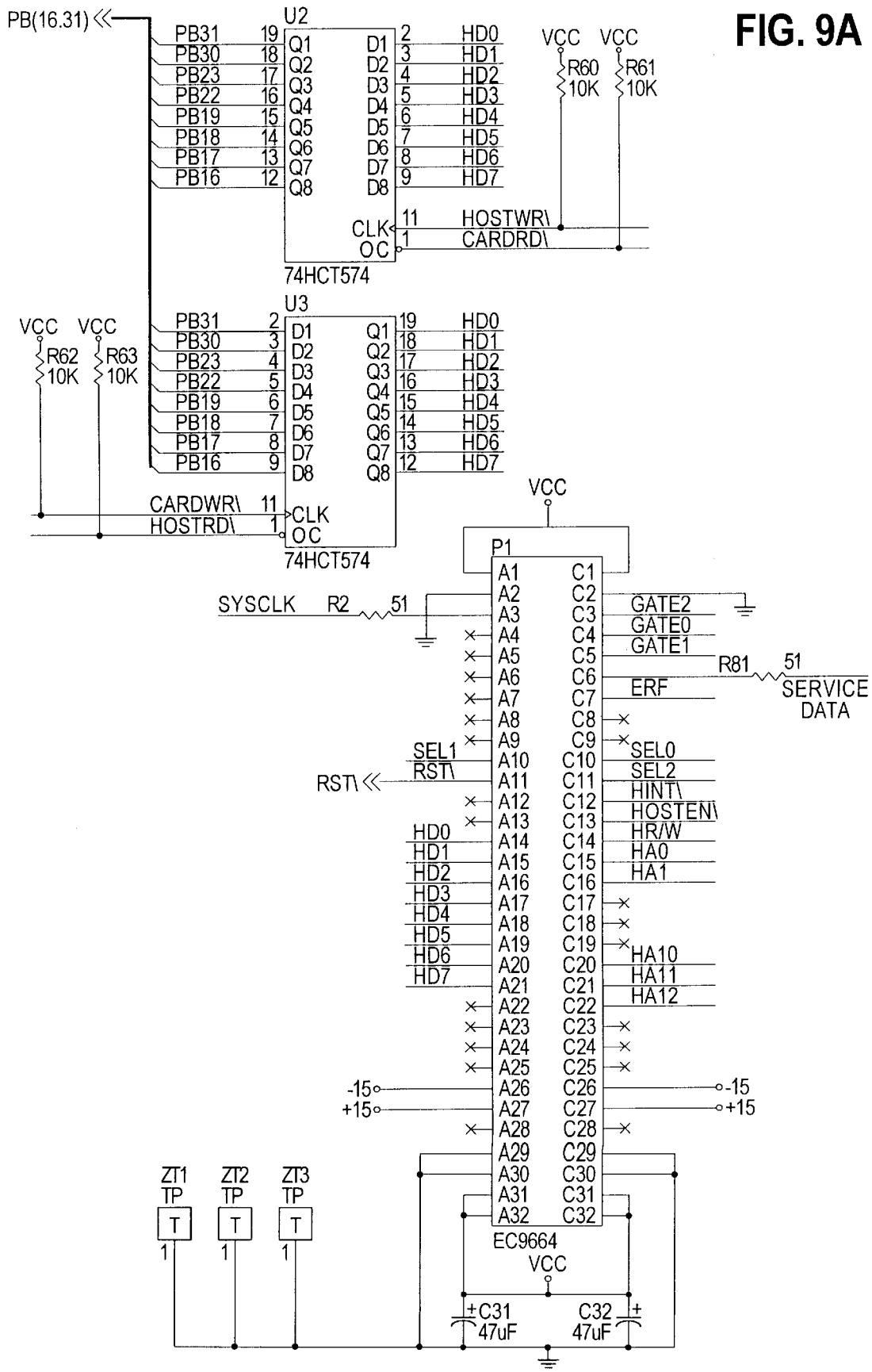
FIG. 9A–B is a wiring diagram of the backplane interface for the preferred Ethernet/Router card of FIG. 8.
Figures 2, 9B:
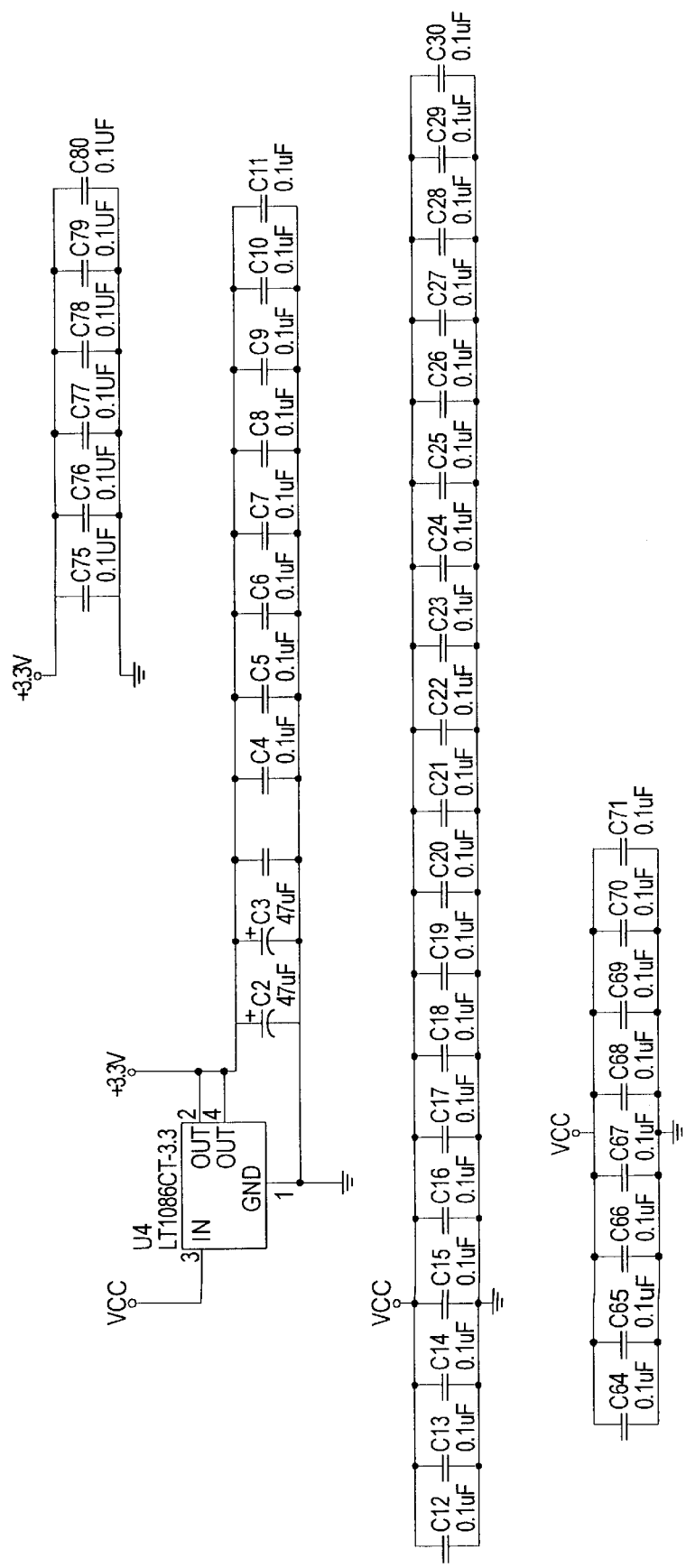
Figure 10A:
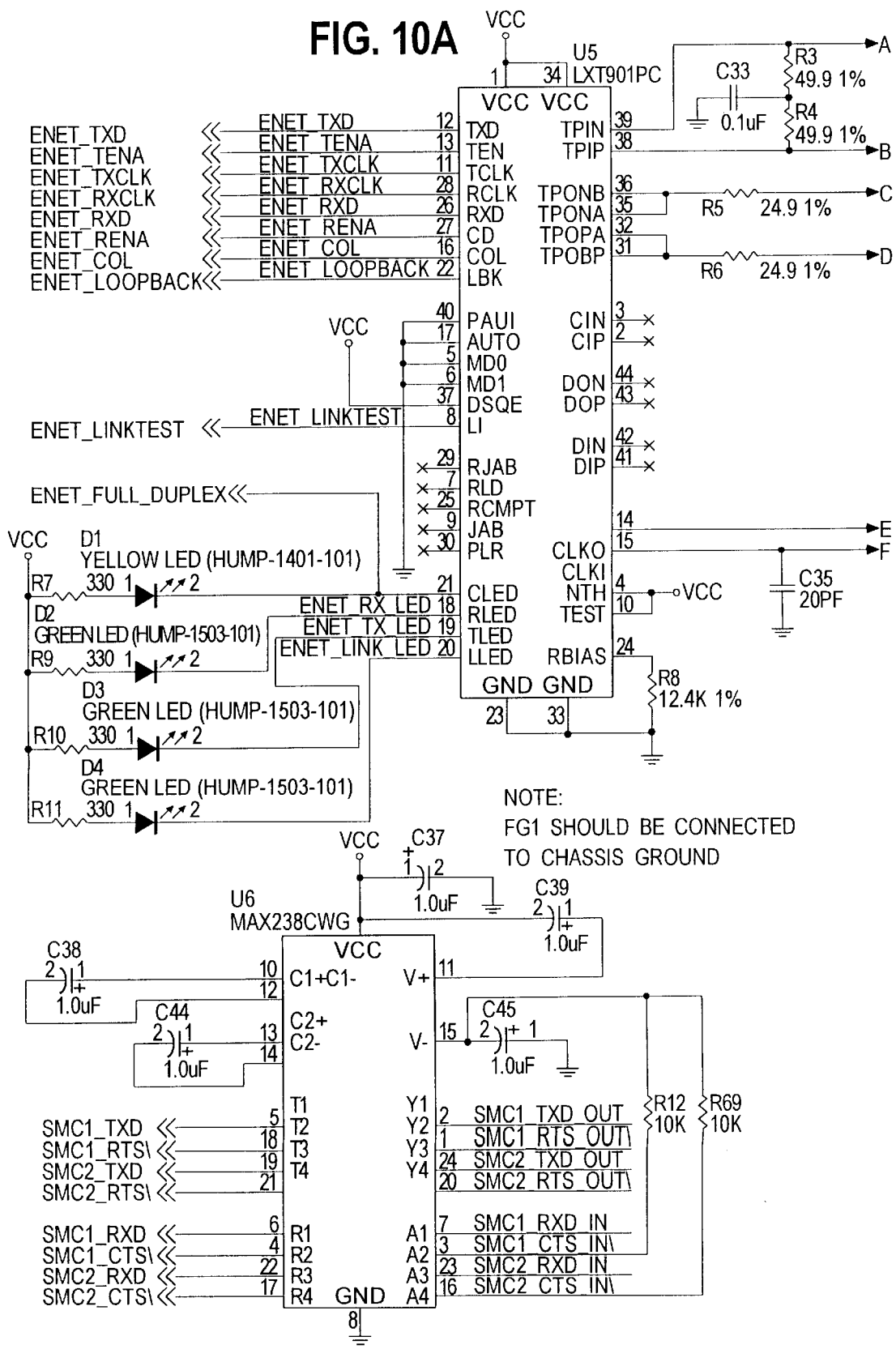
Figure 11A:
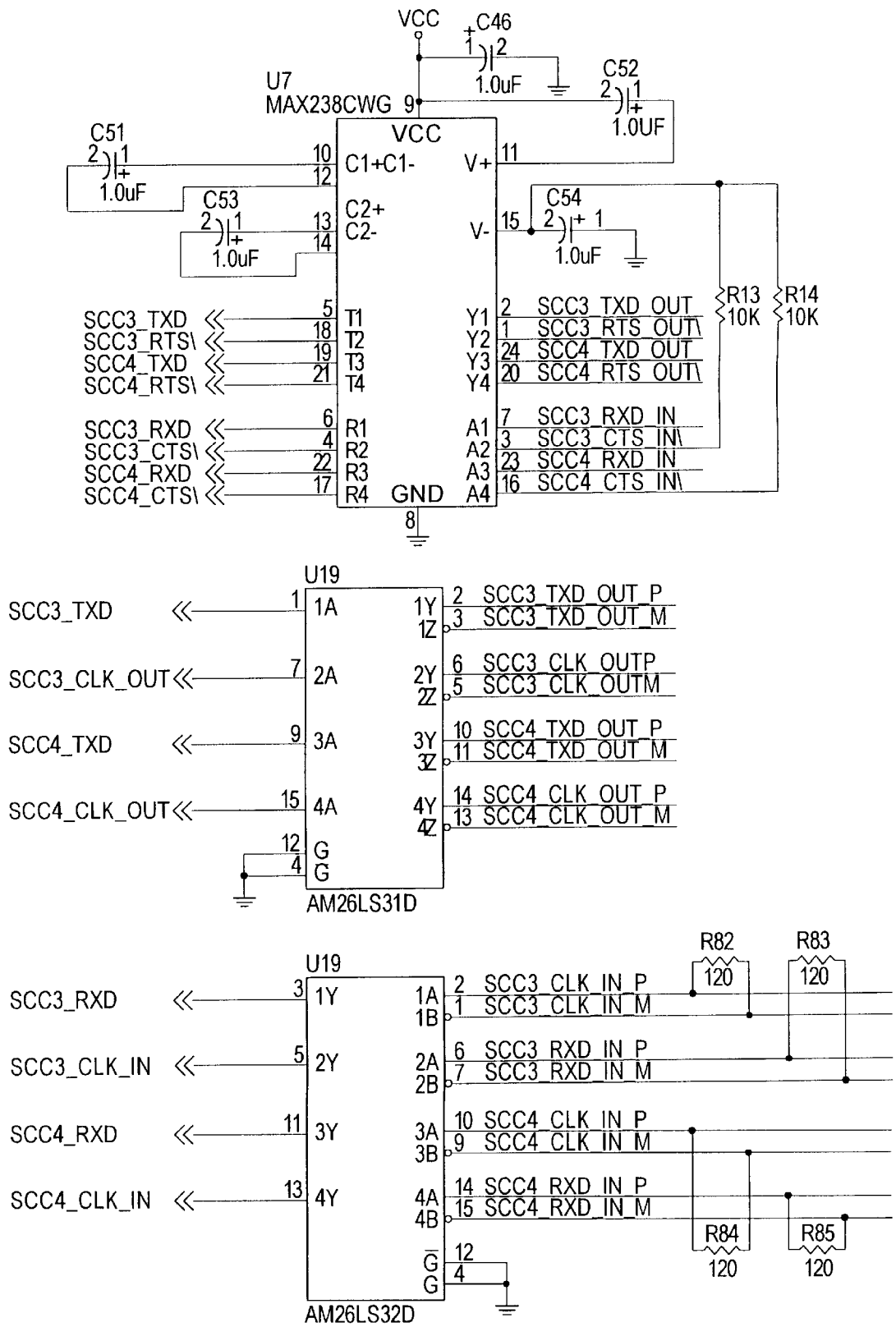
Figures 2, 12A:
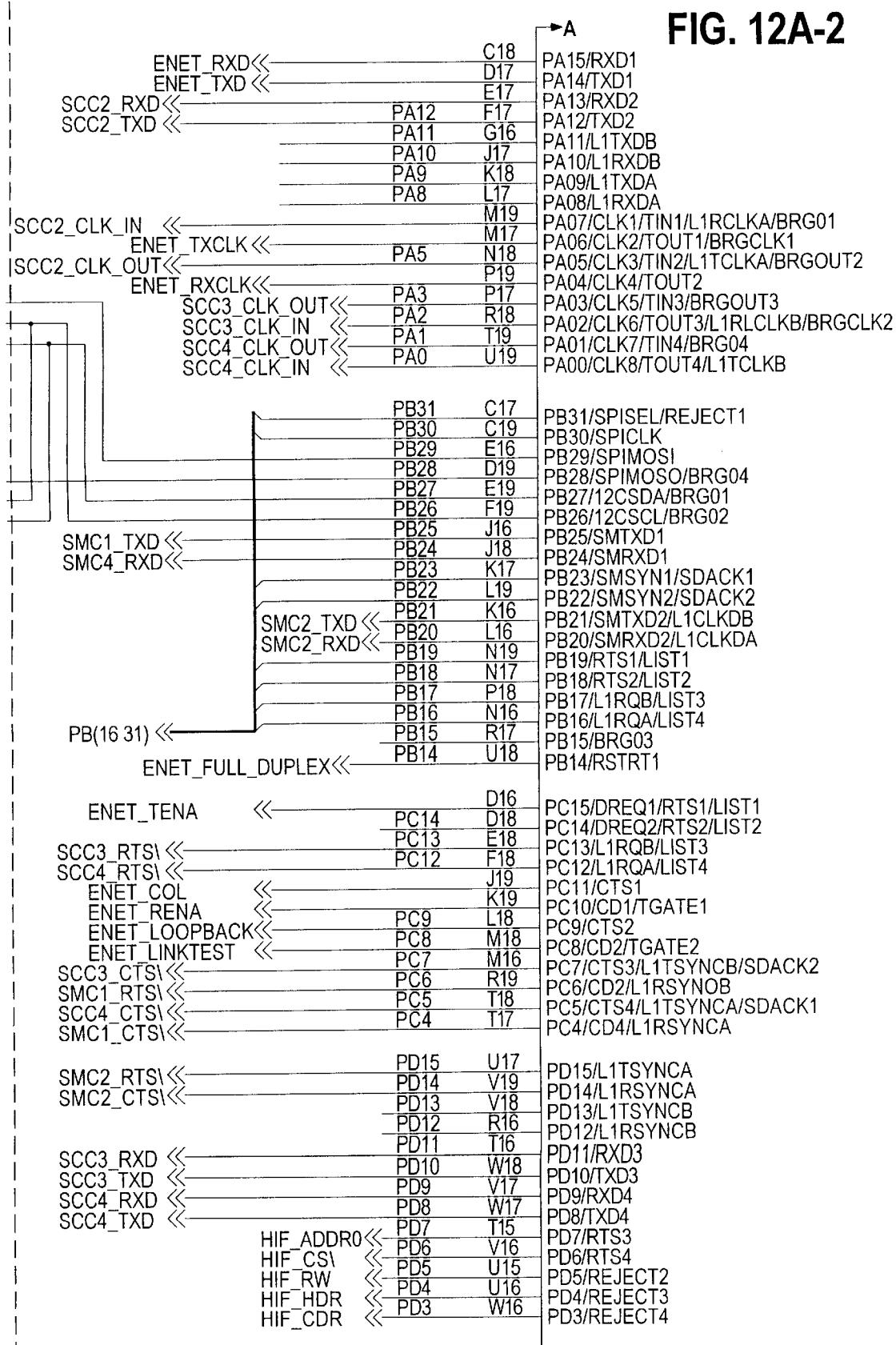
FIG. 12A–B is a wiring diagram for the CPU of the preferred embodiment of FIG. 8.
Figures 3, 12A:
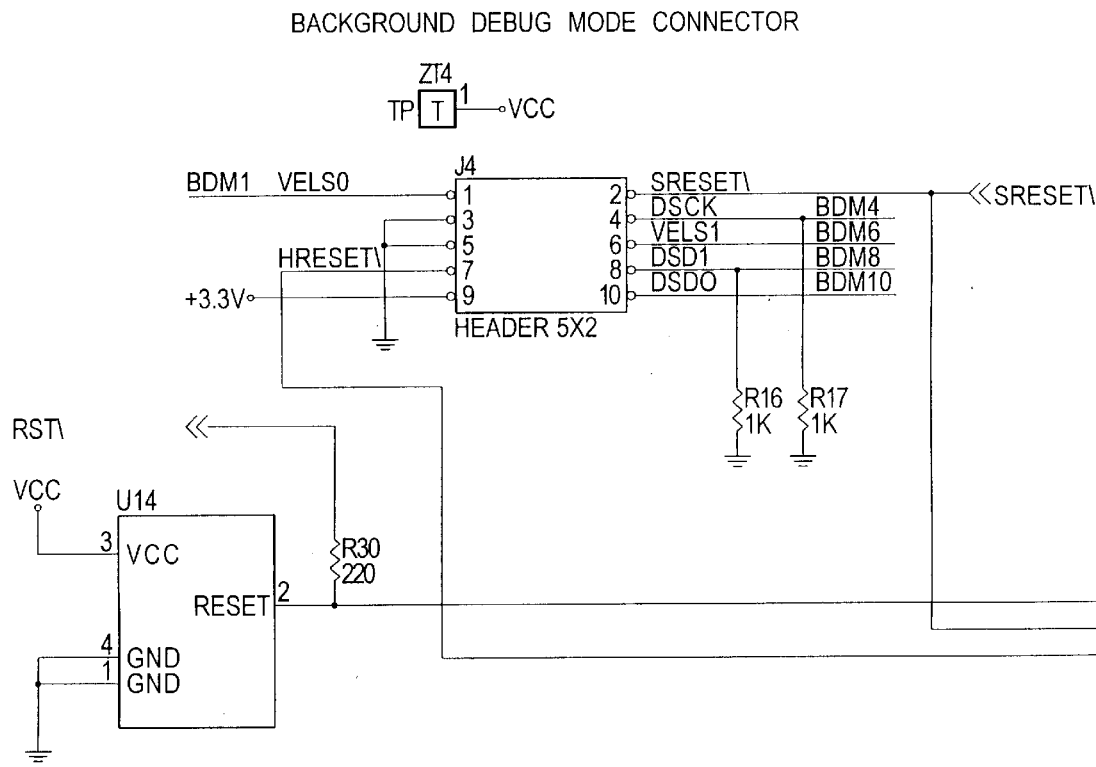
Figures 4, 12A:
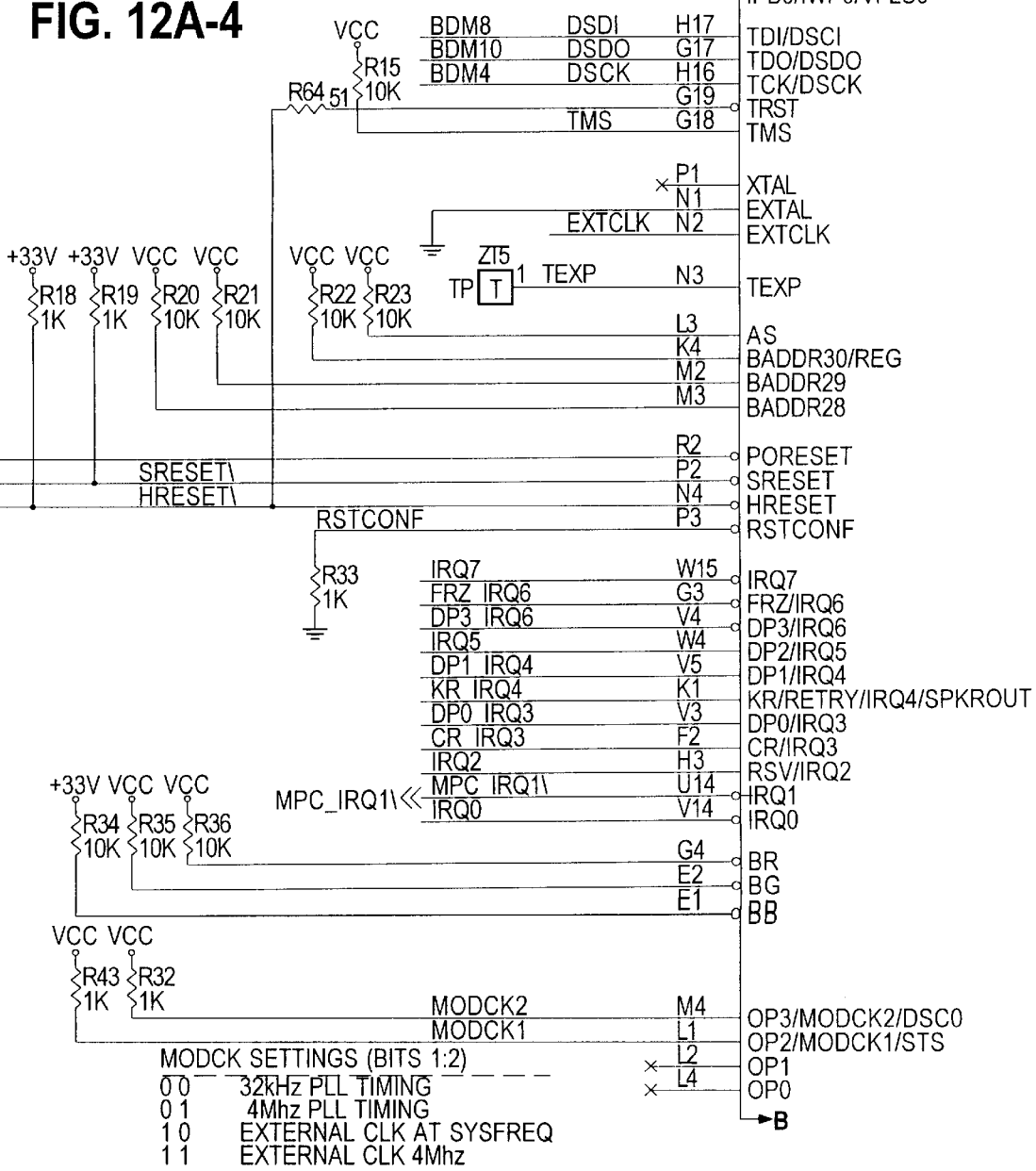
Figures 1, 12B:
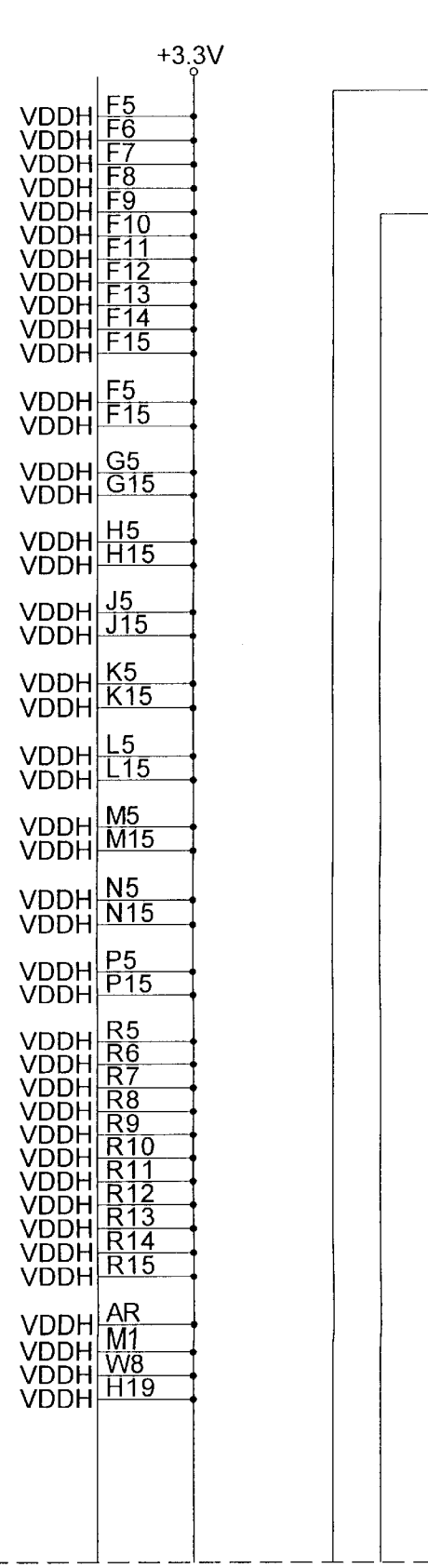
Figures 3, 12B:
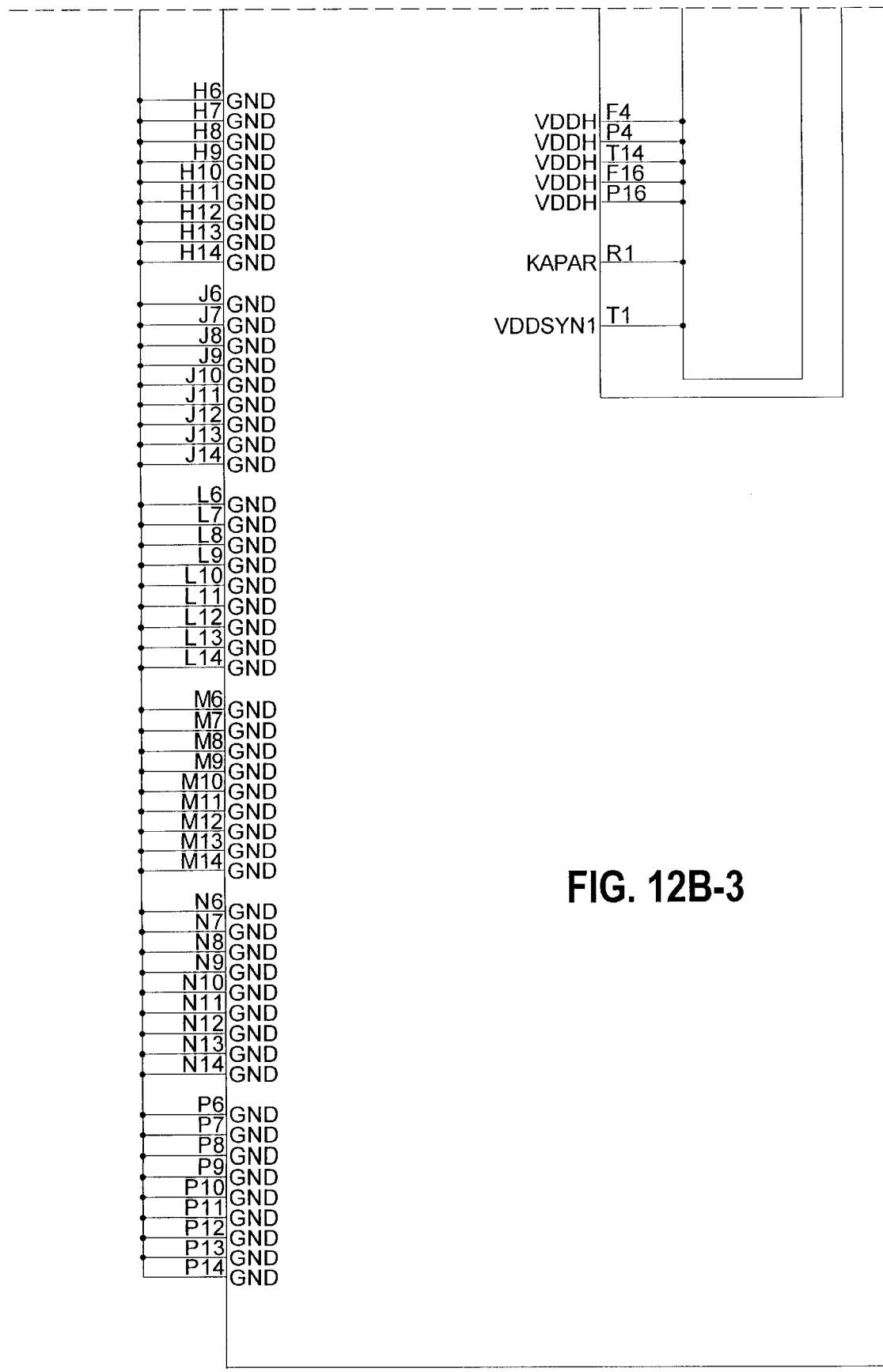
Figures 4, 12B:
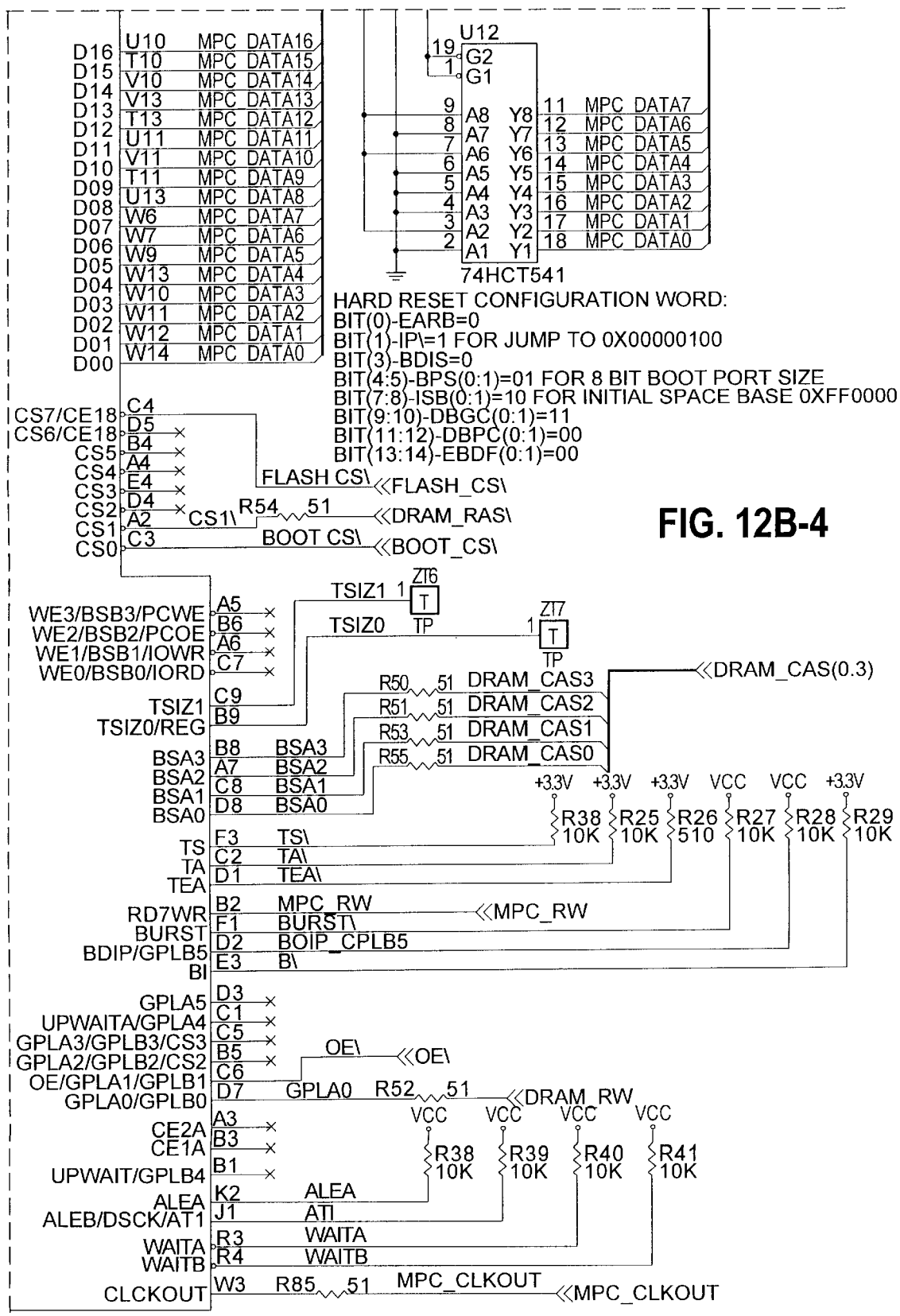
Figure 14:
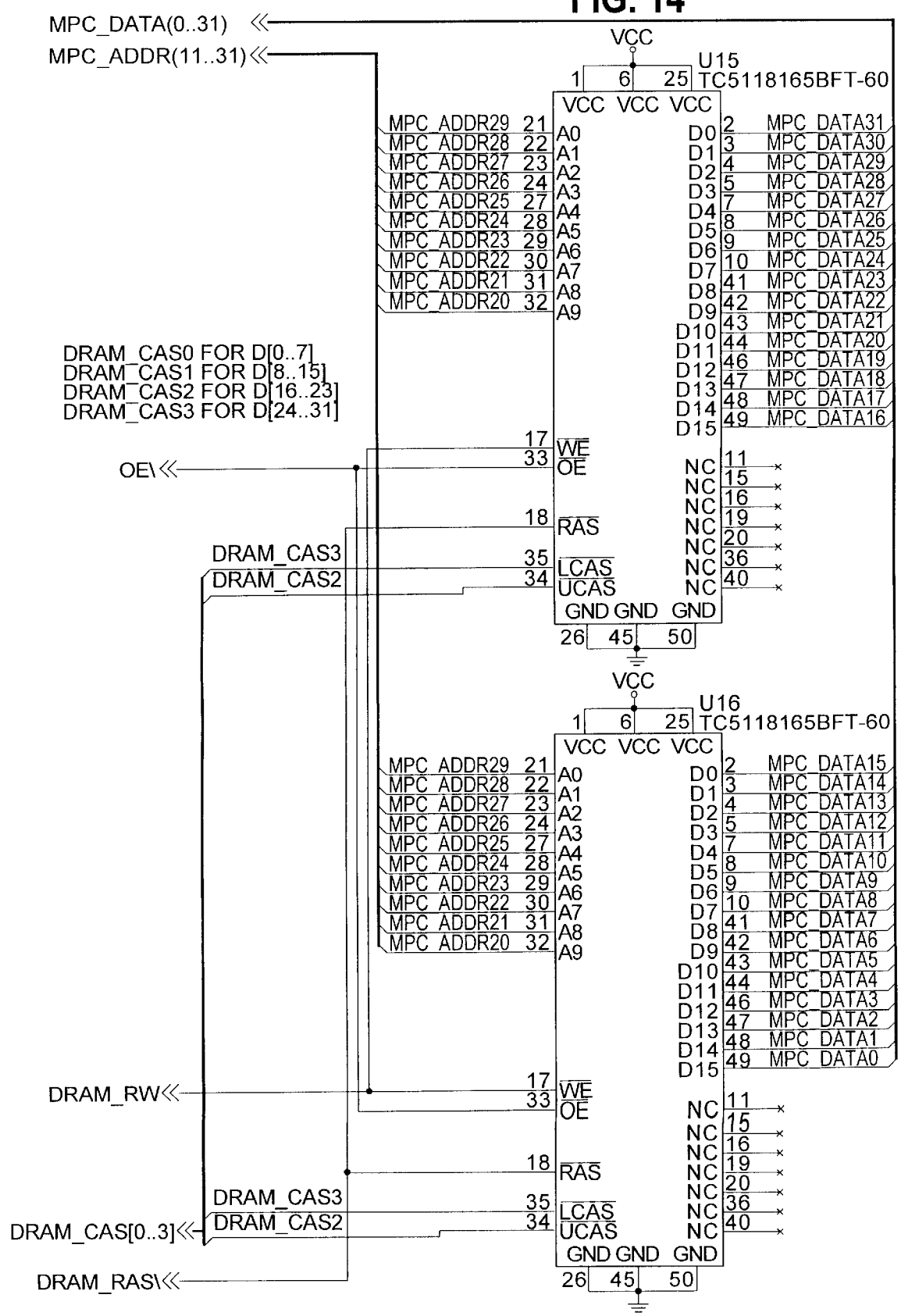
FIG. 14 is a wiring diagram for the Flash RAM on the preferred embodiment of FIG. 8.

All processing shown in FIG. 34 is managed by and largely conducted within the CPU (a Motorola MPC860 processor), which is shown in wiring detail in FIG. 12A, 12B. In this regard, the wiring detail for the backplane interface 90 in FIG. 8 is shown in FIG. 9A, 9B. The wiring detail for the M&C port 114 in FIG. 8 is shown in FIG. 10A–B. The wiring detail for the auxiliary connector 115 in FIG. 8 is shown in FIG. 11A–B. The wiring details for the DRAM and Flash RAM (not shown in FIG. 8) are shown in FIGS. 13 and 14 respectively. The DRAM, Flash RAM, auxiliary connectors, M&C port, backplane interface, and CPU are interconnected on a single insertion circuit board in a fashion well known to those skilled in the art.

Figure 15:
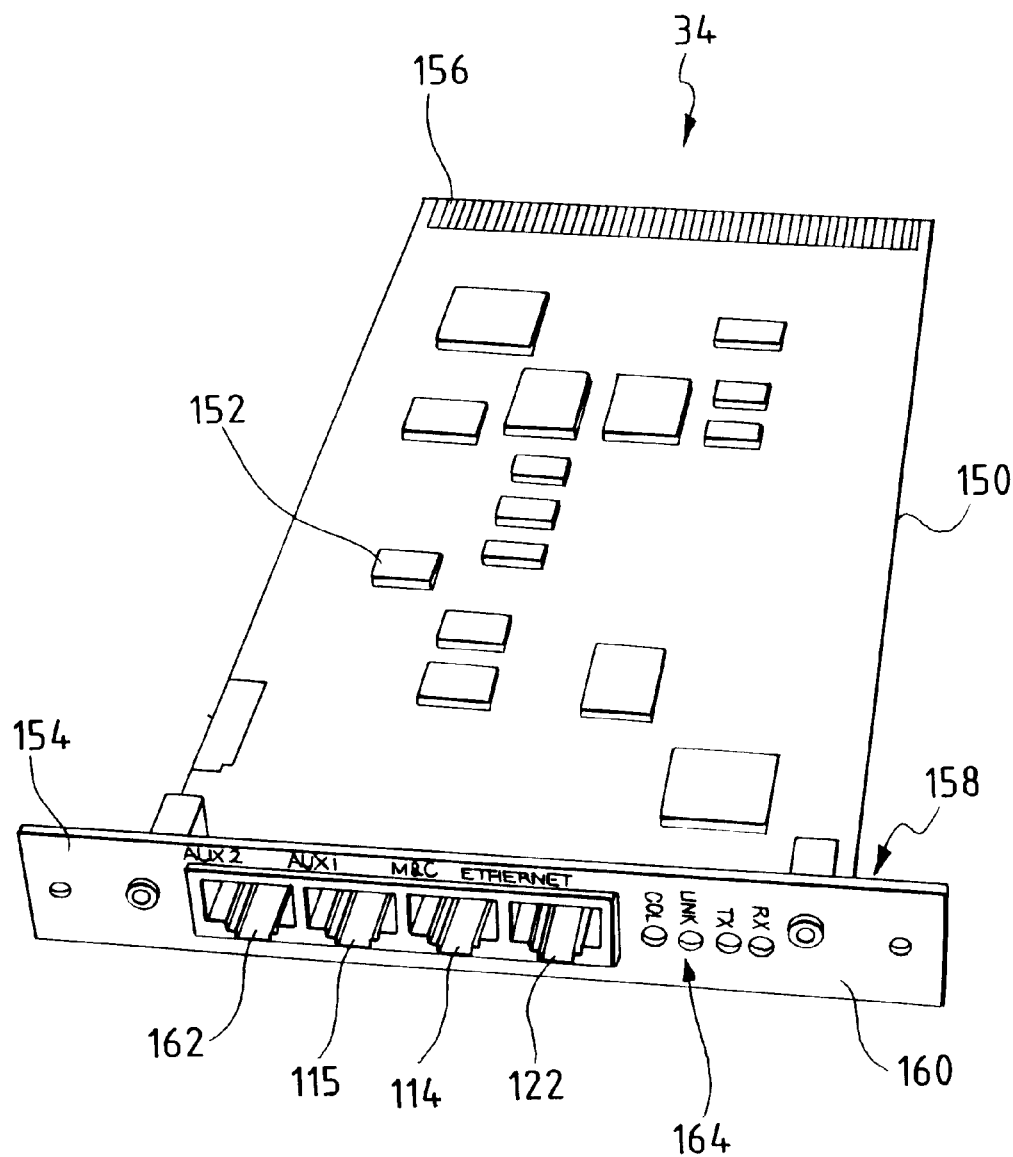
FIG. 15 is a perspective view of the preferred Ethernet/Router card showing the backplane interface connector and the outside face and associated ports and light indicators on the card.

With reference now to FIG. 15, the preferred board 150 has all components, e.g., 152, 154, 156, mounted on the surface of the board 150, including additional support circuitry such as a crystal and reset circuitry, programmable logic arrays, and RS-232 line drivers to support the RS-232 ports 115, 162 well known to those skilled in the art. The insertion end 156 of the card has a conventional backplane connector 156 for connecting the backplane (90 in FIG. 8) to a mating backplane connector (not shown) within a StarGuide® II Receiver. The opposing end 158 of the board 150 has an external face or side 160 extending perpendicularly from the board 150. The external face 160 is flush with the back side (not shown) of a StarGuide® Receiver 34 when removably mounted or inserted in the Receiver 34. Mounted on the face 160 are the Ethernet port 122, the M&C port 114, the two auxiliary ports 115, 162, and a series of indicator lights 164 to indicate transmission, reception, linking, and other board activities.

With reference now to FIG. 8, in the IGMPv2 mode of the preferred receiver/router, the Ethernet/Router card 34 will only allow multicast (UDP) packets to pass to the Ethernet connector 122 if a user has requested the multicast packet stream and the UDP packets are destined for the multicast address for the stream. In static route mode, the Ethernet/Router card 34 will only allow a packet to be output to the Ethernet port 122 if the destination address is contained in the static route table maintained on the card 34.

The user can configure the static route table to pass individual addresses or groups of addresses using a destination address and address mask. The incoming packet's address is logically AND'd (joined) with table entry's mask, and if the result is equal to the table entry's destination address, the packet is passed to the Ethernet ouput port 122.

For example, if any entry in the static route table on the card 34 is set to be: Destination Address: 100.1.3.0; Mask: 255.2555.255.0, then any packets in the address range 100.1.3.0 to 100.1.3.255 will be passed to the Ethernet port 122.

The type of filtering used depends on the type of packet received. If the packet's IP destination address is a multicast address, then the filtering performed is IGMP, if enabled. If the destination address is a unicast address and the packet is an IP packet, static route table filtering is utilized if enabled. The filtering modes can be enabled and disabled independently. If both modes are disabled, all incoming IP packets will be passed out the Ethernet port.

Packets received through HDLC depacketizer 96 are routed through the Ethernet/Router based on their destination IP address. Possible destinations include the command processor 108, as noted above, one of the external asynchronous auxiliary interfaces 113, 115. Commands can be routed to the command processor 108 through packets that are encapsulated with either a Telnet or SNMP protocol. Either protocol allows a user to to monitor or configure the Ethernet/Router card 34. If the destination address of the packet received corresponds to either of the auxiliarly ports 113, 115 (or a route established through these ports 113, 115), then the packet will be forwarded through the appropriate port 113, 115. This allows the auxiliary ports 113, 115 to provide a backchannel to the head end server (18 in FIG. 1) by connecting an external modem (44 in FIG. 2) to one of the auxiliary ports 113, 115 that can establish communication with the head end server 18 through the modem 44.

The modem communication processor 118 can thus include modem protocols so that it can access the modem, have it dial phone numbers, and make a connection with the head-end LAN (19 in FIG. 4).

With continuing reference to FIG. 8, the Ethernet/Router card 34 maintains its own command menus, which are accessible by the StarGuide® II Receiver (32 in FIG. 1) and controllable through the front panel control pad on the Receiver via the host interface in the Receiver. The commands for control of the Ethernet/Router card 34 are set forth in the attached Appendix A to this application. This specification also includes a Source Code Appendix B containing source code for the subject apparatus, in text files readily viewable with commonly available software such as Word for Windows 97 and WordPerfect 7.

Protocols supported by the preferred Ethernet/Router card include IGMPv2 Multicasting (querier and non querier modes), standard TCP/IP (including UDP and Telnet), and SNMP. The preferred Ethernet/Router card thus provides a relatively economical means of upgrading an existing StarGuide® satellite transmission network, and even when deployed with one or more new StarGuide® II Receivers, provides an integrated satellite receiver/router that is much easier to utilize, much more versatile, and significantly less expensive than the conventional, separate receiver and router systems.

In this regard, it should also be noted that the StarGuide® Multiplexer, VBNMS, and Receiver allow for the transmission bandwidth or frequency of the system (e.g., 10 in FIG. 1) to be altered on the fly. The preferred system 10 is thus uniquely flexible, powerful, and yet economical.

The preferred receiver/router eliminates the need for any special or custom software while providing a powerful, reliable, and flexible system for high speed, asymmetrical distribution of Internet or TCP/IP compatible content, including bandwidth intensive audio, video, or multimedia content, to an Ethernet computer network. This is particularly useful where a digital terrestrial infrastructure is lacking, overburdened, otherwise inadequate, or cost prohibitive.

Although in the above detailed description, the applicants preferred embodiments include Internet or telecommunications backchannels, the above system may utilized to provide high speed audio or video multicasting (via UDP packets and deletion of the backchannel). In this utilization of the applicant's receiver/router in a one-way system from the uplink to the reciever/router, all remote LAN's or other connected computers receive the same data broadcast without any interference to the broadcast such as would be encountered if it were to be sent through the Internet backbone. In addition, because the StarGuide® Multiplexer, VBNMS, and Receiver provide for bandwidth on demand, such a multicasting system also provides the flexibility to readily scale bandwidth utilization on the satellite as the bandwidth demands of the multicasted content grow.

It is to be understood that the foregoing is a detailed description of the preferred embodiments. The scope of the invention, however, is to be determined by reference to the accompanying claims.

What is claimed is:

1. A satellite receiver card comprising in combination:
   A. a circuit board;
   B. a receiver backplane connector on the board, said connector being removably insertable within a satellite receiver to receive a data stream from the receiver;
   C. an output member connected to the board providing an Ethernet output port for the board; and
   D. an Ethernet processor mounted on the board to receive at least a portion of the data stream and output TCP/IP packets within the stream to the Ethernet output port on the output member, said Ethernet processor including IP addressing filters, whereby TCP/IP packets are processed by said IP addressing filters prior to being output through said Ethernet output port.

2. The receiver card of claim 1 also including an IP compatible router on the circuit board.

3. The receiver card of claim 1 wherein the Ethernet port on the card is in cooperative communication with an IGMP compatible router mounted within the satellite receiver.

4. The receiver card of claim 1 also including an IGMP compatible router on the circuit board.

5. The receiver card of claim 1 wherein the Ethernet port on the receiver card is in cooperative communication with an IP compatible router mounted within the satellite receiver.

6. The receiver card of claim 3 wherein the Ethernet port on the receiver card is in cooperative communication with an IP compatible router mounted within the satellite receiver.

7. The receiver card of claim 3 also having a IP compatible router on the receiver card.

8. The receiver card of claim 1 also having an SNMP compatible processing unit on the receiver card.

9. The receiver card of claim 1 wherein the Ethernet processor is adapted to receive and forward the TCP/IP packets received from said portion of said data stream without re-assembling the TCP/IP packets.

10. The receiver card of claim 2 wherein the Ethernet processor is adapted to receive and forward the TCP/IP packets received from said portion of said data stream without re-assembling the TCP/IP packets.

11. The receiver card of claim 3 wherein the Ethernet processor is adapted to receive and forward the TCP/IP packets received from said portion of said data stream without re-assembling the TCP/IP packets.

12. The receiver card of claim 4 wherein the Ethernet processor is adapted to receive and forward the TCP/IP packets received from said portion of said data stream without re-assembling the TCP/IP packets.

13. The receiver card of claim 5 wherein the Ethernet processor is adapted to receive and forward the TCP/IP packets received from said portion of said data stream without re-assembling the TCP/IP packets.

14. The receiver card of claim 6 wherein the Ethernet processor is adapted to receive and forward the TCP/IP packets received from said portion of said data stream without re-assembling the TCP/IP packets.

15. The receiver card of claim 7 wherein the Ethernet processor is adapted to receive and forward the TCP/IP packets received from said portion of said data stream without re-assembling the TCP/IP packets.

16. The receiver card of claim 8 wherein the Ethernet processor is adapted to receive and forward the TCP/IP packets received from said portion of said data stream without re-assembling the TCP/IP packets.

17. The receiver card of claim 1 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

18. The receiver card of claim 2 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

19. The receiver card of claim 4 wherein (i) the connector on the receiver card is removably inserable into a slot in the external periphery of the satellite receiver and (ii) the backplane connector on the card is thereby removably mountable onto a mating backplane connector on a board within the satellite receiver to receive said data stream from said receiver.

20. The receiver card of claim 8 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

21. The receiver card of claim 9 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

22. The receiver card of claim 10 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

23. The receiver card of claim 11 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

24. The receiver card of claim 16 wherein (i) the connector on the receiver card is removably insertable into a slot in the external periphery of the satellite receiver and (ii) the backplane connector on the card is thereby removably mountable onto a mating backplane connector on a board within the satellite receiver to receive said data stream from said receiver.

* * * * *

UNITED STATES PATENT AND TRADEMARK OFFICE
CERTIFICATE OF CORRECTION

PATENT NO. : 6,160,797 Page 1 of 1
APPLICATION NO. : 09/287200
DATED : December 12, 2000
INVENTOR(S) : Roswell Roberts, III et al.

It is certified that error appears in the above-identified patent and that said Letters Patent is hereby corrected as shown below:

Column 1, lines 6-7, delete "is a continuation of, and claims priority through," insert --claims benefit under 35 U.S.C. §119 (e) of-- therefor.

Signed and Sealed this

Twenty-fourth Day of June, 2008

JON W. DUDAS
*Director of the United States Patent and Trademark Office*